US011436565B2

(12) United States Patent
Ken-Dror

(10) Patent No.: US 11,436,565 B2
(45) Date of Patent: Sep. 6, 2022

(54) SYSTEM AND METHOD FOR ORGANIZING AND DESIGNING COMMENT

(71) Applicant: EMM PATENTS LTD., Even Yehuda (IL)

(72) Inventor: Eli Ken-Dror, Herzlia (IL)

(73) Assignee: EMM Patents Ltd., Even Yehuda (IL)

( * ) Notice: Subject to any disclaimer, the term of this patent is extended or adjusted under 35 U.S.C. 154(b) by 0 days.

(21) Appl. No.: 16/990,632

(22) Filed: Aug. 11, 2020

(65) Prior Publication Data
US 2021/0027249 A1  Jan. 28, 2021

Related U.S. Application Data

(63) Continuation of application No. 14/149,904, filed on Jan. 8, 2014, now Pat. No. 10,776,756.

(60) Provisional application No. 61/749,936, filed on Jan. 8, 2013.

(51) Int. Cl.
*G06F 17/10* (2006.01)
*G06Q 10/10* (2012.01)
*G06Q 30/02* (2012.01)
*G06Q 50/00* (2012.01)

(52) U.S. Cl.
CPC ....... *G06Q 10/103* (2013.01); *G06Q 30/0269* (2013.01); *G06Q 50/01* (2013.01)

(58) Field of Classification Search
CPC ... G06Q 10/103; G06Q 30/0269; G06Q 50/01
See application file for complete search history.

(56) References Cited

U.S. PATENT DOCUMENTS

| 6,931,254 | B1* | 8/2005 | Egner | H04W 4/021 |
| | | | | 455/456.3 |
| 7,072,863 | B1* | 7/2006 | Phillips | G06Q 40/00 |
| | | | | 703/2 |
| 7,080,139 | B1 | 7/2006 | Briggs | |
| 9,129,008 | B1* | 9/2015 | Kuznetsov | G06F 16/313 |
| 2009/0164408 | A1* | 6/2009 | Grigorik | G06F 16/9535 |
| 2009/0249223 | A1 | 10/2009 | Barsook | |
| 2010/0057743 | A1 | 3/2010 | Pierce | |

(Continued)

OTHER PUBLICATIONS

Blair-Goldensohn et al., Building a Sentiment Summarizer for Local Service Reviews (Year: 2008).

*Primary Examiner* — Shahid K Khan
(74) *Attorney, Agent, or Firm* — Browdy and Neimark, P.L.L.C.

(57) ABSTRACT

The present invention provides a method for determining and organizing multimedia content of a network page, related to reactions of at least one user to at least one common content object or context. The method comprising the steps of: receiving plurality of comments originated by different users relating one or more common multimedia object, wherein the user is required to define characteristics of their comment from multiple choice of definition types, enabling users to react to said comment by selecting one type of reaction from multiple choice of reaction types, wherein the each reaction type define different characteristics of the comment, analyzing comment characteristics as defined by the originator user and/or by reaction type; and selecting and organizing of comments and/or content objects which are related to the comments and/or and the relevant reactions according to the said analysis.

11 Claims, 30 Drawing Sheets

(56) References Cited

U.S. PATENT DOCUMENTS

| | | |
|---|---|---|
| 2011/0179385 A1 | 7/2011 | Li et al. |
| 2012/0011208 A1 | 1/2012 | Erhart |
| 2012/0179751 A1 | 7/2012 | Ahn |
| 2013/0018957 A1 | 1/2013 | Parnaby |
| 2013/0151613 A1* | 6/2013 | Dhawan ................ G06Q 50/01 709/204 |
| 2013/0159406 A1* | 6/2013 | Chand ................... G06Q 50/01 709/204 |
| 2013/0204833 A1* | 8/2013 | Pang ..................... G06Q 30/02 706/52 |
| 2013/0346067 A1 | 12/2013 | Bhatt |
| 2014/0004489 A1* | 1/2014 | Kim ...................... G09B 19/00 434/236 |
| 2014/0088944 A1 | 3/2014 | Natarajan |

* cited by examiner

SYSTEM AND METHOD FOR ORGANIZING AND DESIGNING COMMENT

BACKGROUND

Technical Field

The present invention relates to the field of multimedia object selection organization and design and more specifically selection and organization of users' comments for website content.

BRIEF SUMMARY

The present invention provides a method for determining and organizing multimedia content of a network page, related to reactions of at least one user to at least one common content object or context. The method comprising the steps of: receiving plurality of comments originated by different users relating one or more common multimedia object, wherein the user is required to define characteristics of their comment from multiple choice of definition types, enabling users to react to said comment by selecting one type of reaction from multiple choice of reaction types, wherein the each reaction type define different characteristics of the comment, analyzing comment characteristics as defined by the originator user and/or by reaction type; and determining comments and/or content objects which are related to the comments and/or and the relevant reactions according to the said analysis.

According to some embodiments of the present invention the selection and organization is customized according user or users group profile, wherein the profile is updated on the basis of user selection of comment characteristics.

According to some embodiments of the present invention the organization include design layout of comment or content objects.

According to some embodiments of the present invention the organization include design of multimedia the comment including at least one of: shape, size color, icons and emoticon additions next to the text.

According to some embodiments of the present invention the comment characteristics define user's emotional attitude in relation to the comment.

According to some embodiments of the present invention the analysis include statistical calculation reaction types selections;

According to some embodiments of the present invention the analysis include NLP or sentiment analysis of comments content;

According to some embodiments of the present invention the analysis further includes checking user activities in relation to the network page, including at least one of: viewings ads, purchasing activities.

According to some embodiments of the present invention the user definition selection or reaction which define characteristics of the comment provide current emotional state of the user, enabling time based customization of content and or comments The present invention provides a system for selecting and organizing multimedia content within network page, related to reactions of at least one user to at least one common content object or context.
The system comprised of:
A GUI module for
receiving plurality of comments originated by different users relating one or more common multimedia object, wherein the user is required to define characteristics of their comment from multiple choice of definition types; and
enabling users to react to said comment by selecting one type of reaction from multiple choice of reaction types, wherein the each reaction type define different characteristics of the comment, and
Processing module for
analyzing comment characteristics as defined by the originator user and/or by reaction type and determining comments and/or content objects which are related to the comments and/or and the relevant reactions according to the said analysis;

BRIEF DESCRIPTION OF THE DRAWINGS

The present invention will be more readily understood from the detailed description of embodiments thereof made in conjunction with the accompanying drawings of which:

FIG. 29 is an example of providing recommendation comments according to some embodiments of the invention.

FIG. 30 is an example of providing recommendation comments according to some embodiments of the invention.

DETAILED DESCRIPTION

Figure 1:
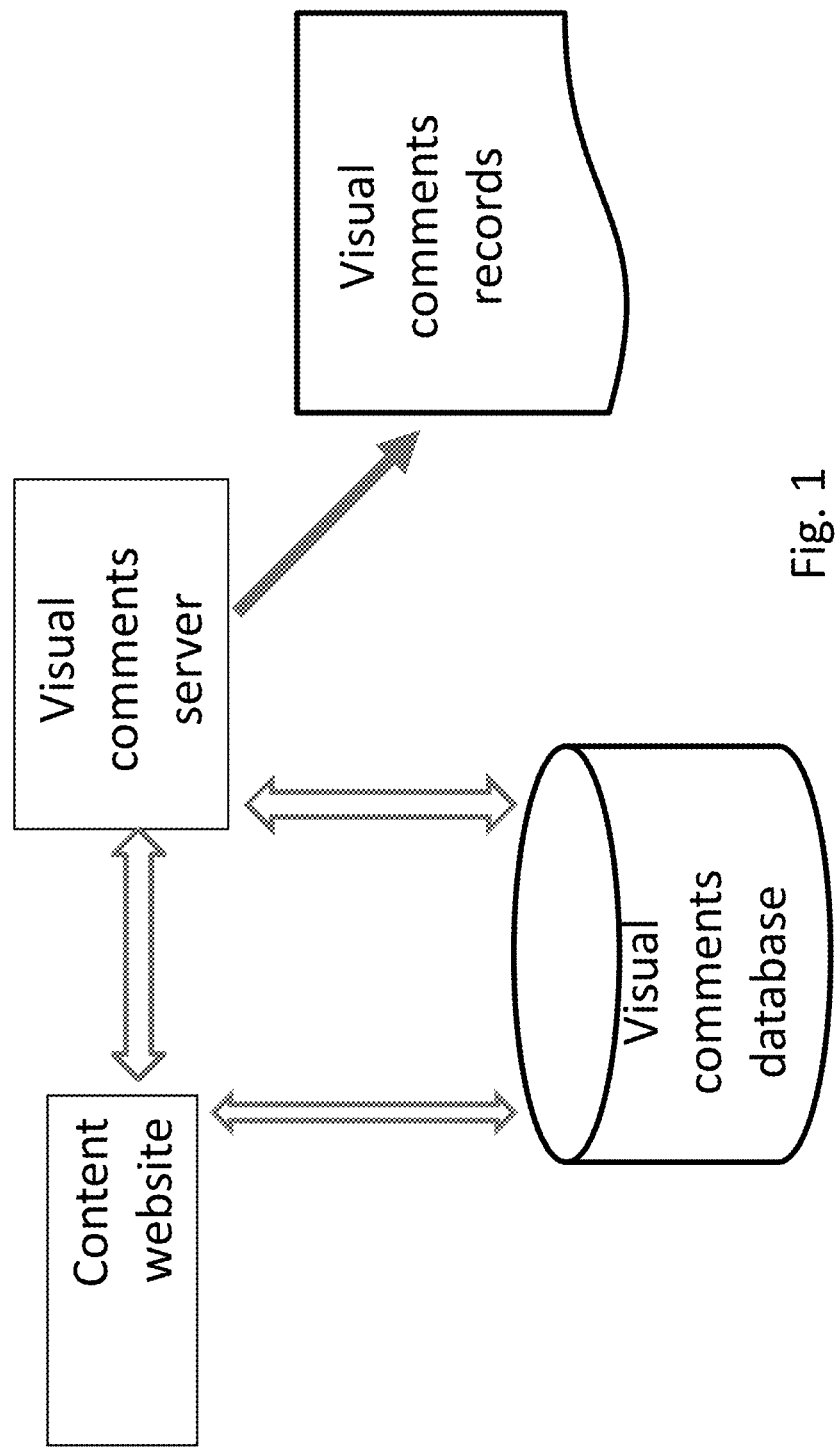
FIG. 1 is block diagram illustrating the visual comments platform according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention provides a commenting system which enables users to determine the characteristics of the written comments, by defining their own original comment or reacting to other user comments. The determination process is implemented as multiple choices GUI enabling the user to select his preference from predefined list definitions. The characteristics and definition may represent, user's emotional attitude toward the comment (e.g. happy, sad. Etc) or optionally classification of the comment such as: question, opinion, review etc.

The characteristics may be defined differently by the originator user and by the reacting users.

The commenting system aggregates data of the user definition and reactions and generates user profiles based on analysis of the aggregated data. The profile according to some embodiments of the present invention provides emotional characteristics of the user enabling customized data content per user or group of users accordingly.

The present invention provides a method and system for providing new presentation platform for comments of users in relation to multimedia objects appearing in a web page of a data network, such as comments for a text article in news portals or comments to published video. Comments may refer to a single context in a forum platform or text message appearing in a chat application which relate to a common context.

The new presentation platform provides dynamic visual display of the comments which are displayed within a callout. The design of the comments text the callout and layout of spreading the comments on the screen is determined according to predefined rules based on viewing statistics, feedback to comments and user profile.

FIG. 1 is block diagram illustrating the visual comments platform according to some embodiments of the invention. A content web site 100 such as news portal having plurality of content items stored in content items database 300 is associated with a visual content server 200 and visual comments database 400. Each content item has an identifier and each comment is related to at least one content item and at least one user. The news portal may have an original feedback comments platform which enables each user to insert text comment in relation to a content item. The visual content server as suggested by the present invention provides an upgraded feedback comments platform which can be implemented in addition to the existing platform displaying visual comment on top of the content web-site portal or as integration with the news portal using the visual comments server as the only feedback platform.

Figure 2:
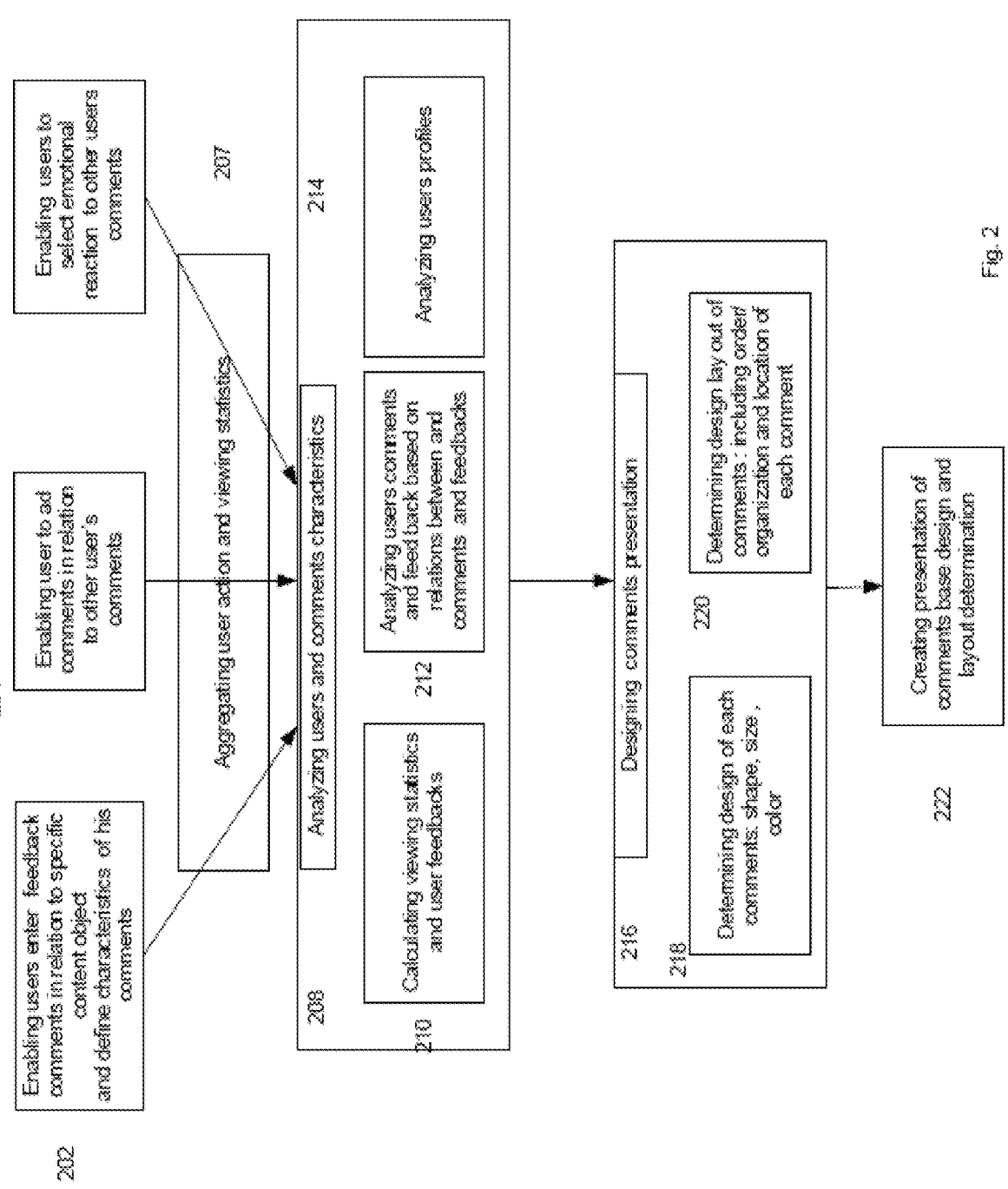
FIG. 2 is a flow chart illustrating the process of managing comments according to some embodiments of the invention.

FIG. 2 is a flow chart illustrating the process of managing comments according to some embodiments of the invention. The comments platform enables the user the following action: to send a comment feedback to specific content object (202) and define comment characteristics e.g. by selecting between emotional category, send comment in relation to other user comment (204) or enable user select an emotion reaction by clicking on icon (e.g. smiley). All user action and reviews are aggregated by the visual comments server 207 which for analyzing user comments and feedback 208. The analyzing include calculating viewing statics and feedback statistics of comments (210), analyzing feedback comments to other users comments (212) and analyzing user profile (214) which may include: gender, geographic location, age, Etc.

Based on this analysis is designed the visual presentation of the comments (216) including: (i) determination of the text and callout design attributes (218) such as: size, shape, color, background or any visual effect such as brightness, transparency, highlighting etc., (ii) determining design layout by defining organization and relative location of each visual comments presentation (220). For example the size of the callout may change according viewing statistic, or color according to most user emotional reaction, the layout may reflect popularity of a comment or geographic association between the respective users.

At the final stage, is created the full presentation of the visual comments based on the design and layout determination (222).

Figure 2A:
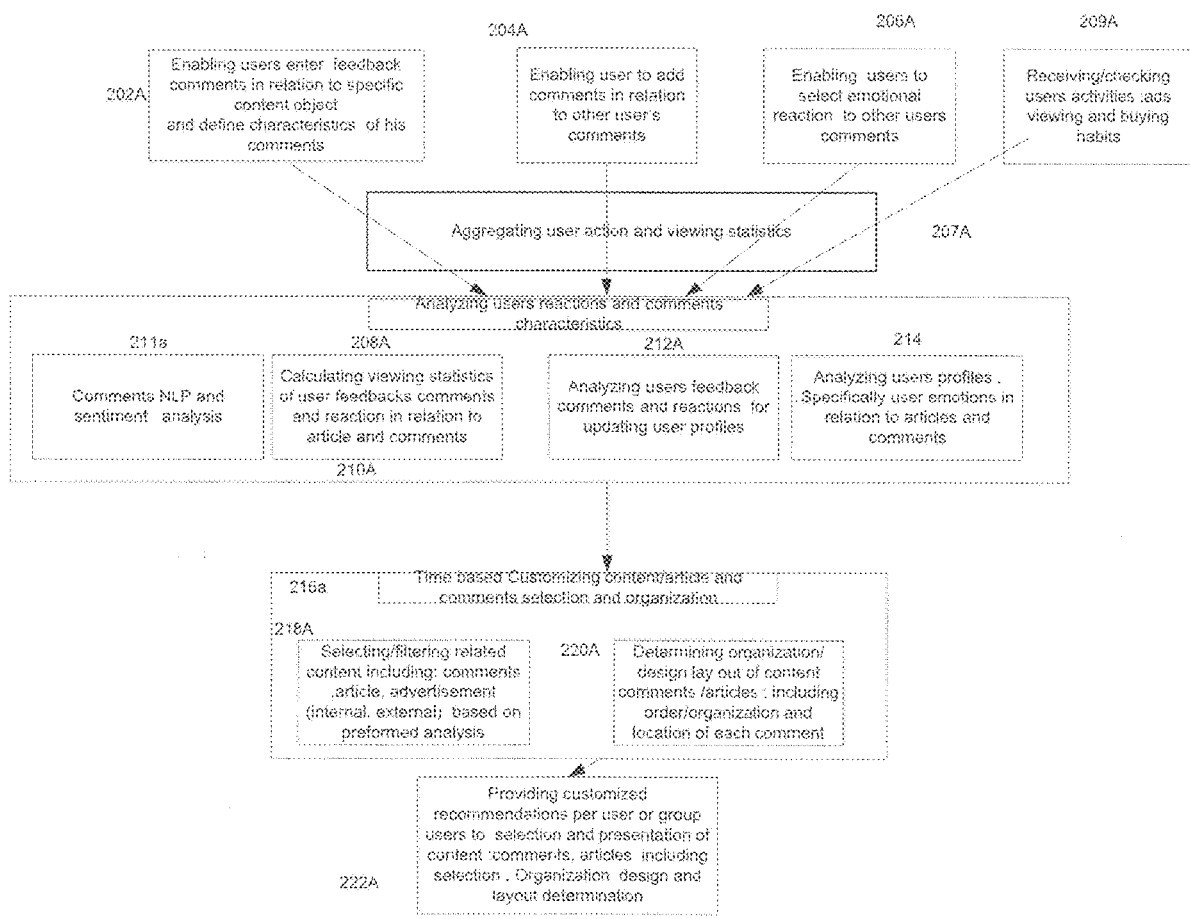
FIG. 2A is a flow chart illustrating the process of customizing managing comments according to some embodiments of the invention.

FIG. 2A is a flow chart illustrating the process of customizing managing comments according to some embodiments of the invention. The comments platform using GUI module enables the user the following action: to send a comment feedback to specific content object and define comment characteristics (202A), send comment in relation to other user's comment (204A) or enable user select an emotion reaction by clicking on an icon (e.g. smiley). All user actions and reactions are aggregated by the visual comments server (207A) for analyzing user feedback comments/messages characteristics based on reactions and/or commenting user definitions (208A). The analyzing include at least one of the following: calculating viewing statics and feedback statistics of comments and reactions (210A), analyzing feedback comments and/or reaction characteristics for updating users profiles (212A), NLP and sentiment analysis of comments text and analyzing user profile, specifically user emotions in relation to articles and comments (214) which may include emotion vector based comments and reaction analysis, gender based, geographic location, age, Etc.

Based on this analysis is preformed customization of content objects and comments which include (216a) (i) selection an filtering related content including content objects (such as article, image, video), comments, advertizing (218A), the content may be internal of the relevant web page or external from other websites, the selection and filtering is correlated user emotional attitude as reflected by his definitions and reaction (ii) determining design layout by defining organization and relative location of each visual comments presentation (220A). For example a smiley icon or emoticon may be next to the user text or the size of the callout may change according viewing statistic, or color according to most user emotional reaction, the layout may reflect popularity of a comment or geographic association between the respective users.

According to some embodiments of the present invention the customization is time based according to the current or recent emotional state of the user as identified from his selection of definitions or reactions to define the characteristics of the comment.

Based on the customization process are provided customized recommendations per single user or group of users, the recommendations may include selection of content items or comments and organization, such the order of the recommendations (222A).

According to some embodiments of the present invention the customization process can be used to customization of the relevant web page or any other web page content object per user or for groups of users. Based on the algorithm results and saved user profile data other websites and applications may customize the their content per user or a group of users.

Figure 3:
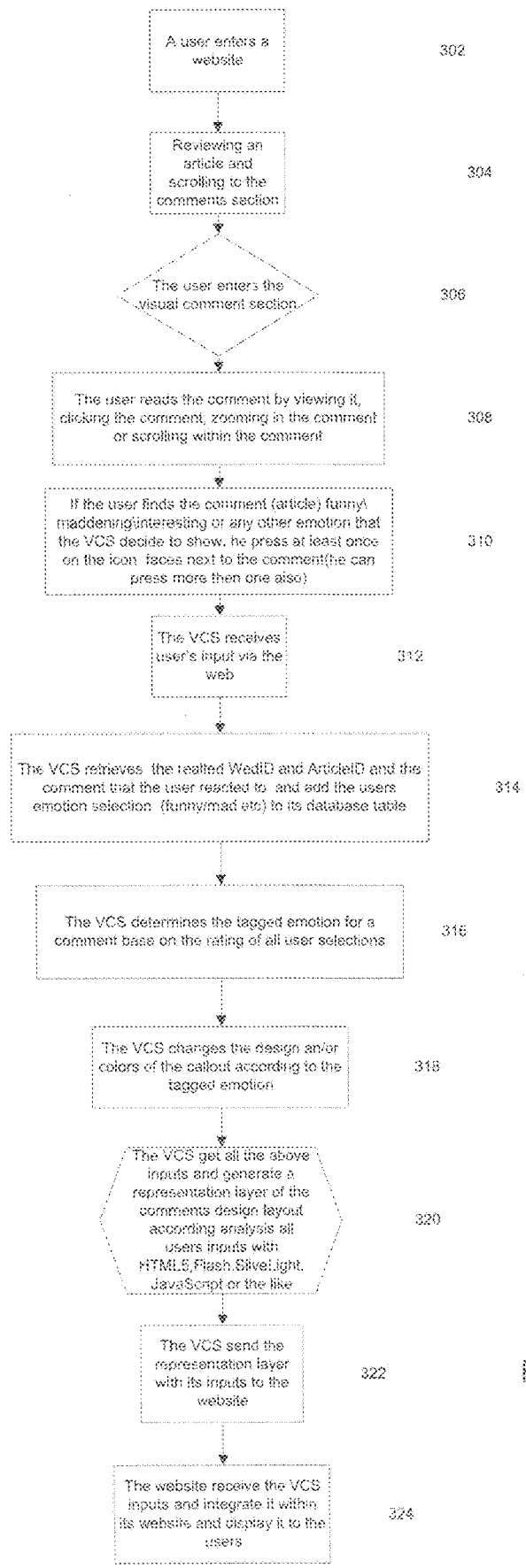
FIG. 3 is a flow chart illustrating the processing of comments according to some embodiments of the invention.

FIG. 3 is a flow chart illustrating the processing of existing comments according to some embodiments of the invention. Upon entering a content web site (302) such as news portal, the user may review a specific article and scroll down to the comments section (304), and then optionally the user enters the visual comments section (306). Once the user entered the section, the user may view specific comment, zoom in the comment area or scrolling through (within) the comments (308). Optionally the user may choose to give feedback to the comment by clicking on one icon which reflects his emotional reaction to the comment such as: happy, sad, funny maddening, interesting etc (310). The user action is conveyed to the VCS through a communication network (314). The VCS retrieves user action data with related user id and content item ID and saves the information in database 300. Next, the VSC calculates statistics of user actions (316) for changing the comments text callout design attributes such size color or shape. Based on all designs changes the VCS prepare the presentation of the visual comments (320). The presentation is conveyed to the respective content web-site 100.

Figure 4:
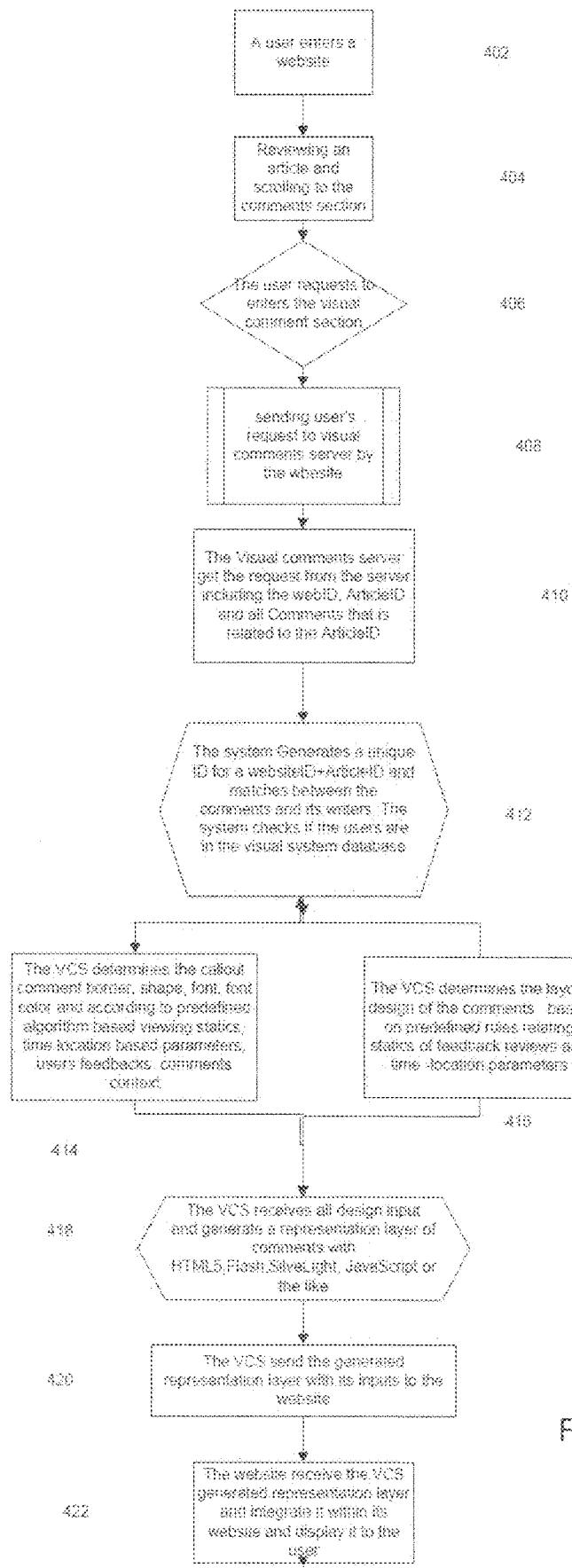
FIG. 4 is a flow chart illustrating the processing of comments according to some embodiments of the invention.

FIG. 4 is a flow chart illustrating the processing of comments according to some embodiments of the invention. Upon entering a content web site (402) such as news portal, the user may review a specific article and scroll down to the comments section (404), and then optionally the user requests to enter the visual comments section (406). Once the user entered the section, the user request is conveyed by the content website 100 to VSC server via a data communication network (408). The VSC server receives the user request with website ID, content item ID, and all comments associated with the respective content (410). Based one received information the VCS serve generates a unique ID for specific website and content item (412) and correlates between the comments and respective user which sent the comment. The VCS may check if the users appear in the data base 300 and updates the database accordingly 412.

The VSC system analyses viewing statistics, time-location based parameters, users feedback comments and reaction contexts for determining the design attributes of comment callout and the layout design (414, 416).

At the next step (418), the VCS receives all design input and generate a representation layer of comments with HTML5, Flash, SilverLight, JavaScript or the like. The VCS send the generated representation layer with its inputs to the respective content website 100 via a data communication network. Finally the content website receives the VCS generated representation layer and integrates it within its website for displaying it to the user as part of the webpage which contain the relevant content item or in overlay window displayed above the relevant content item.

Figure 5:
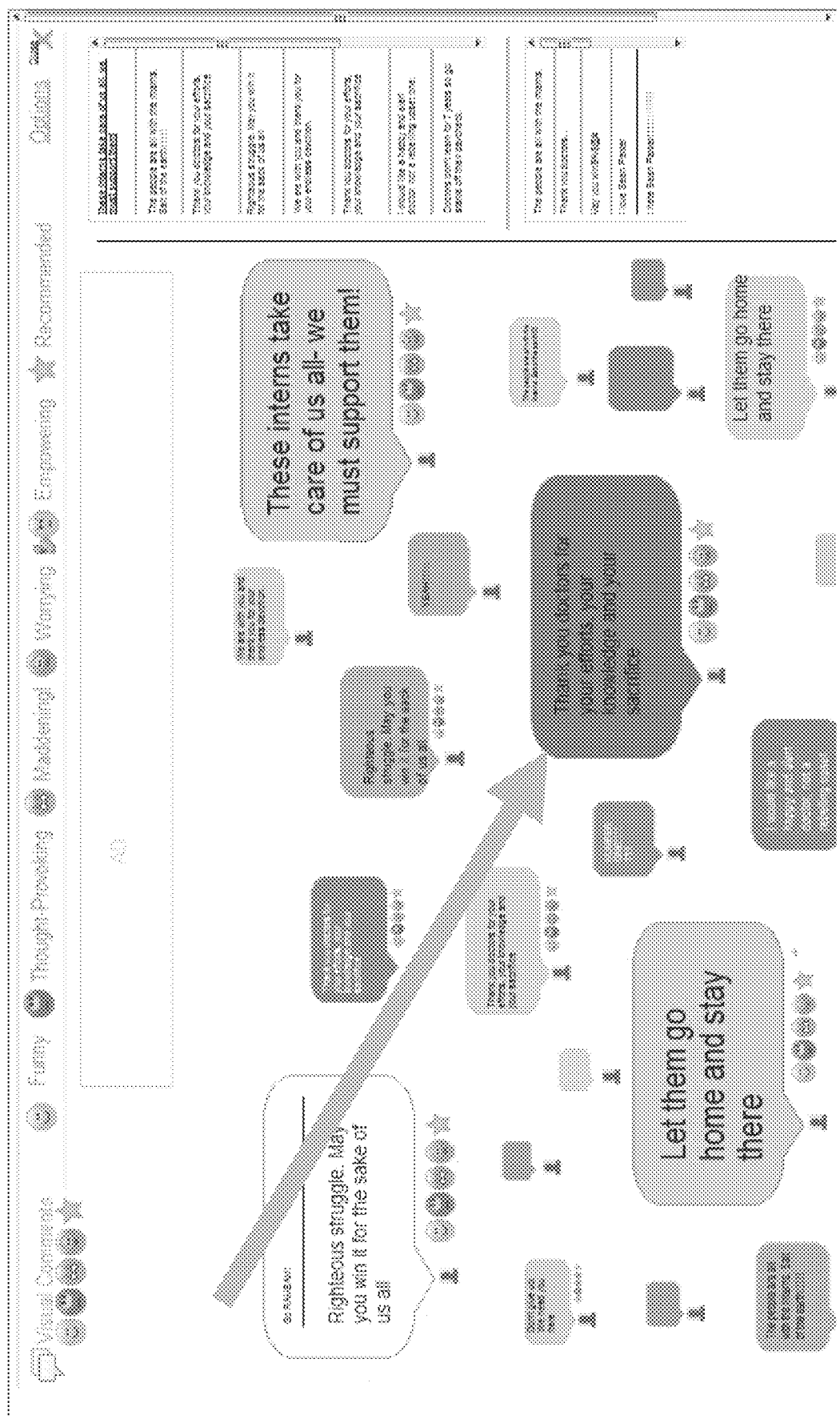
FIGS. 5-6 is an illustration of the Overall look and feel of the comments representation according to some embodiments of the invention.
Figure 6:
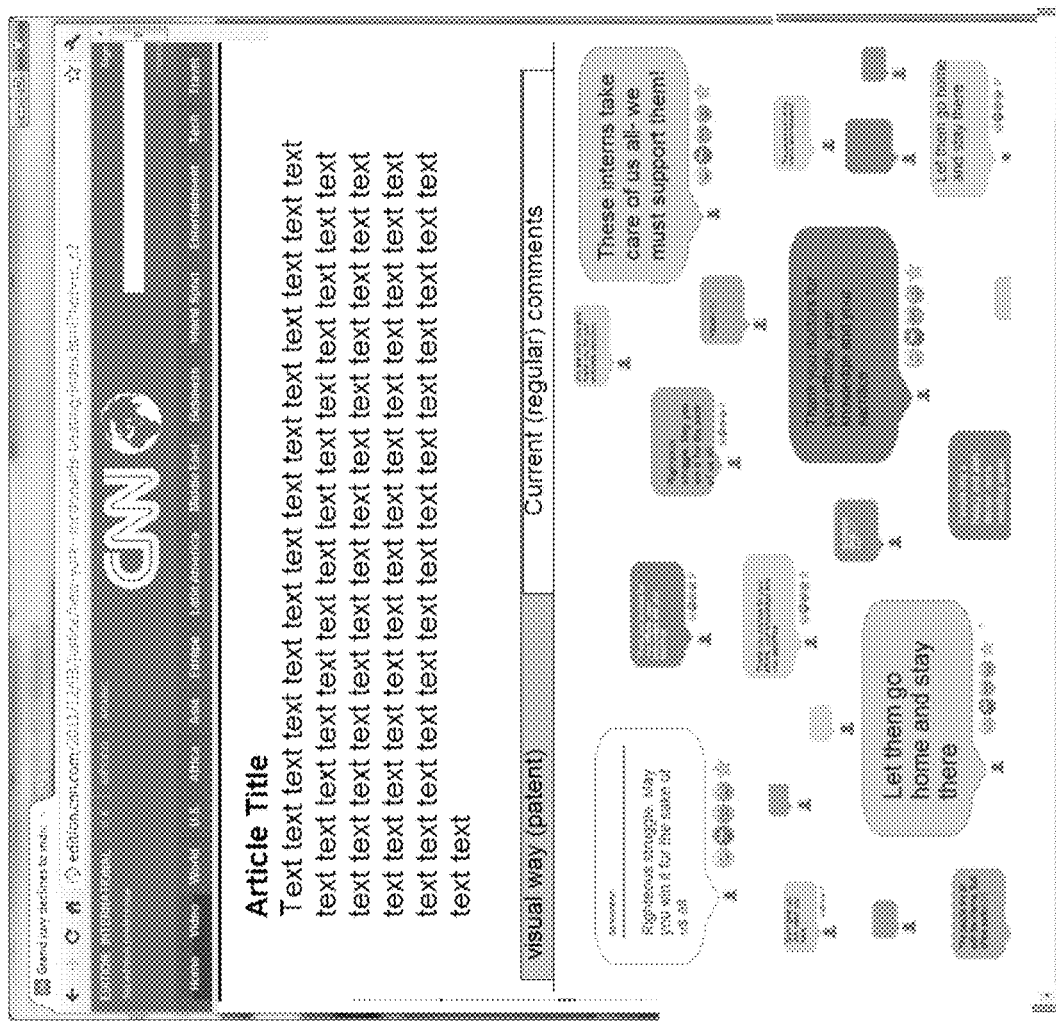

FIGS. 5-6 are illustrations of the Overall look and feel of the comments representation according to some embodiments of the invention. As seen in the FIG. 5, each comment appears within a callout with clickable icon enabling users to express their emotion in relation to the comment. The callout design is different for each comment, representing statistical analysis review and reaction to the comments as described above.

Figure 7:
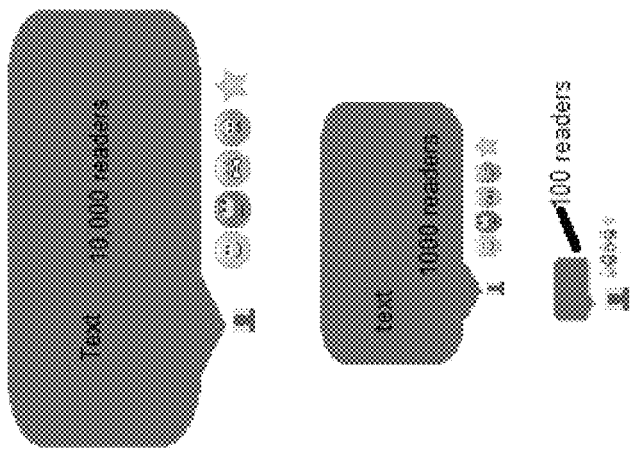
FIG. 7 illustrates the effect on of comments callout design in relation to the number of readers according to some embodiments of the invention.

FIG. 7 illustrate the effect on of comments callout design in relation to the number of readers according to some embodiments of the invention. This figure exemplifies one option in design change by enlarging the callout of the comment which relatively received more reviews.

Figure 8:
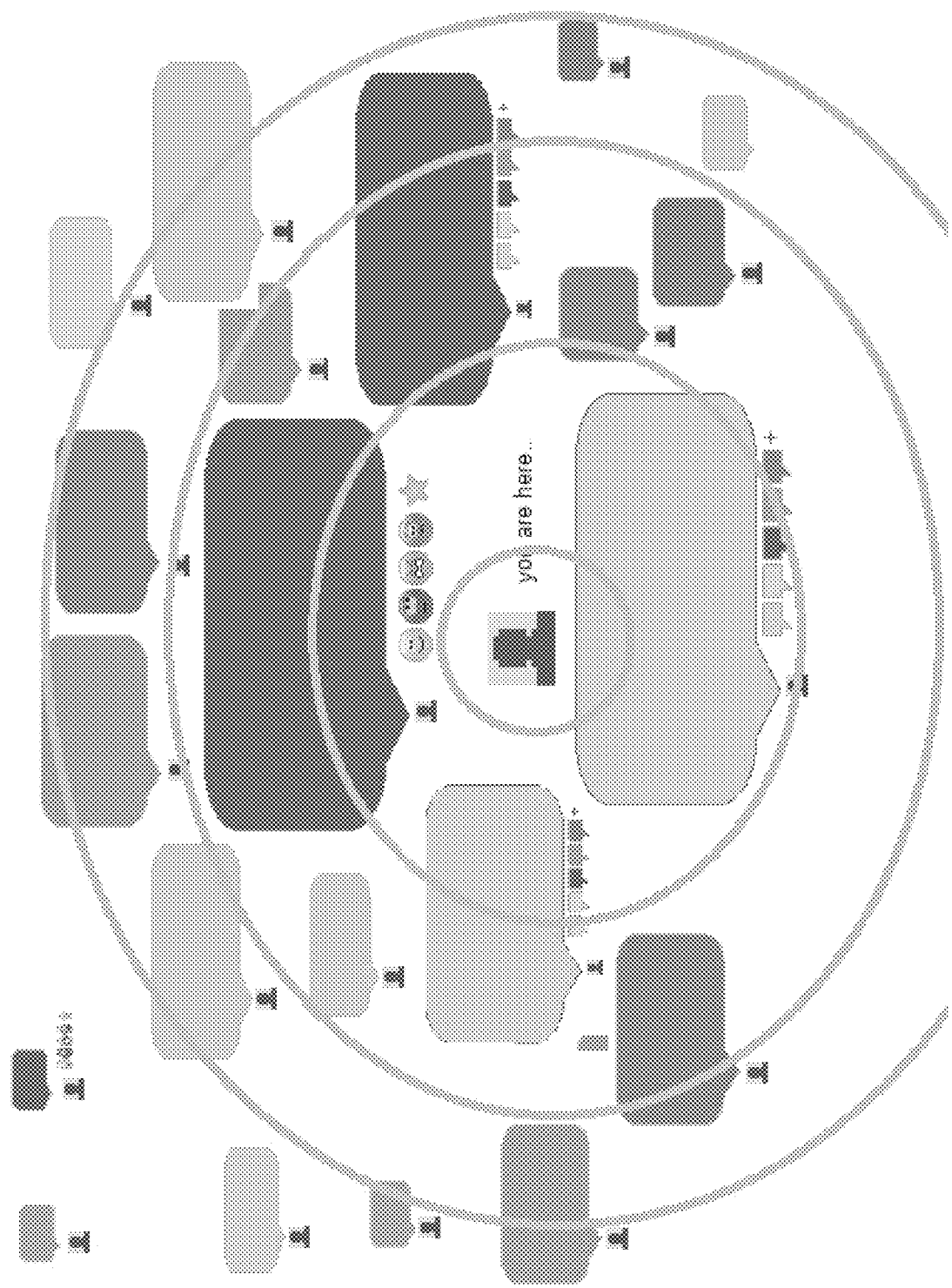
FIG. 8 is an illustration the comments design layout based on demographic profile of the user according to some embodiments of the invention.

FIG. 8 is an illustration the comments design layout based on demographic profile of the user according to some embodiments of the invention. This figure exemplifies one option in design layout change where comments of user which geographically are close appear closer to each other in relation to other comments.

Figure 9:
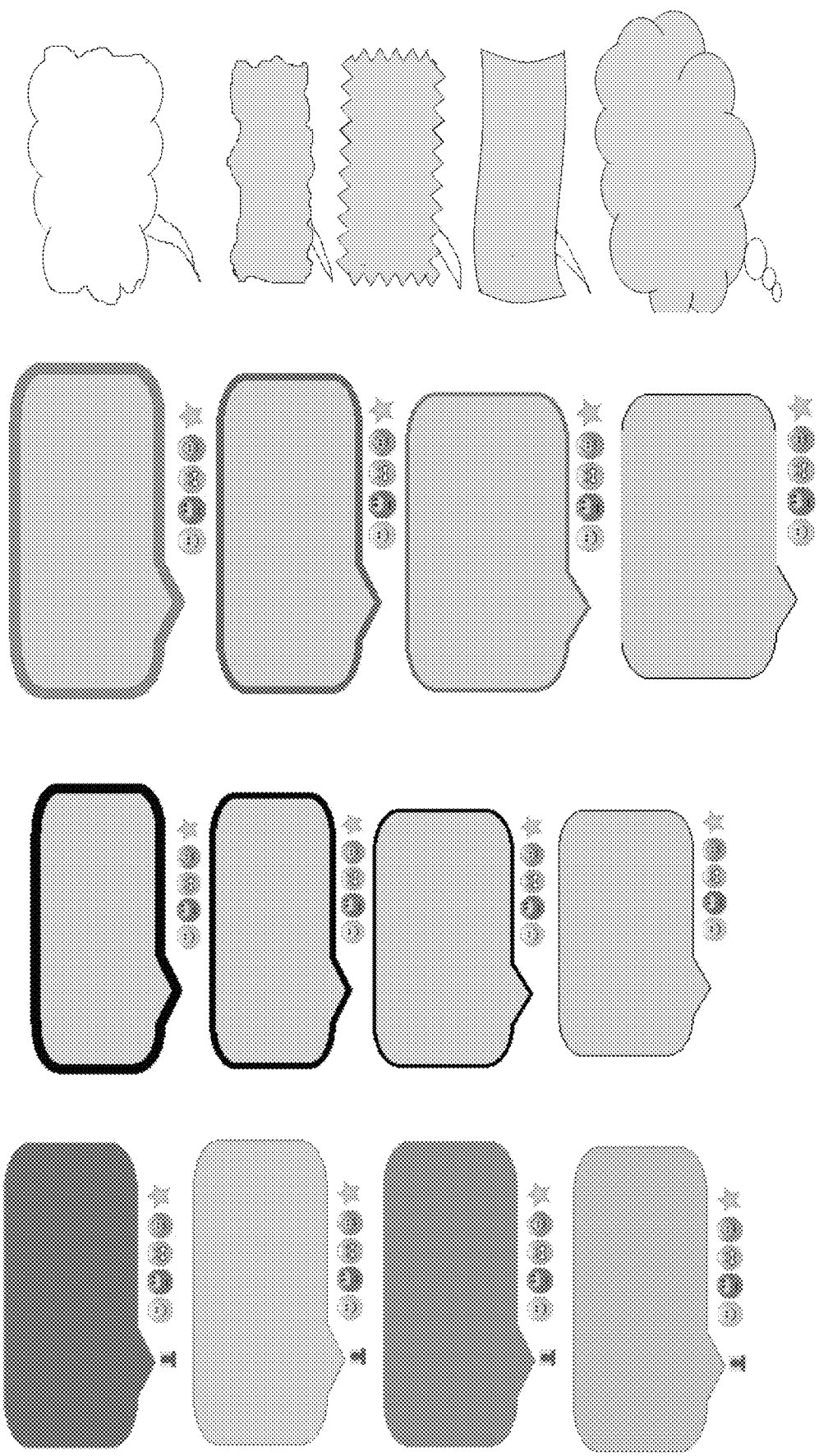
FIG. 9 is an example of different callouts designs according to some embodiments of the invention.

FIG. 9 is an example of different possible callouts designs according to some embodiments of the invention.

Figure 10:
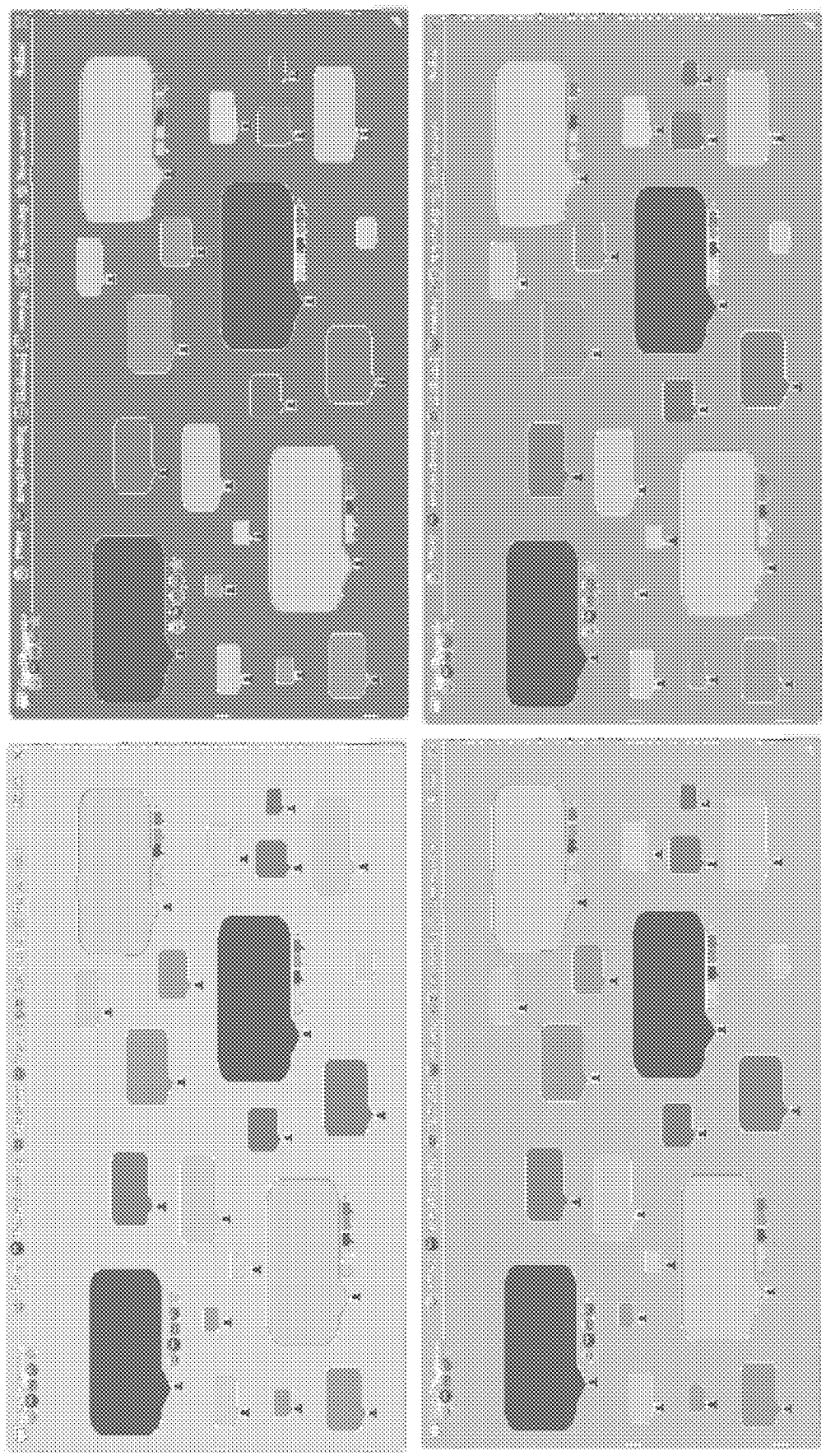
FIG. 10 is an example of the comments callouts presentation with changing background according to some embodiments of the invention.

FIG. 10 is an example of the comments callouts presentation with changing background according to some embodiments of the invention.

Figure 11:
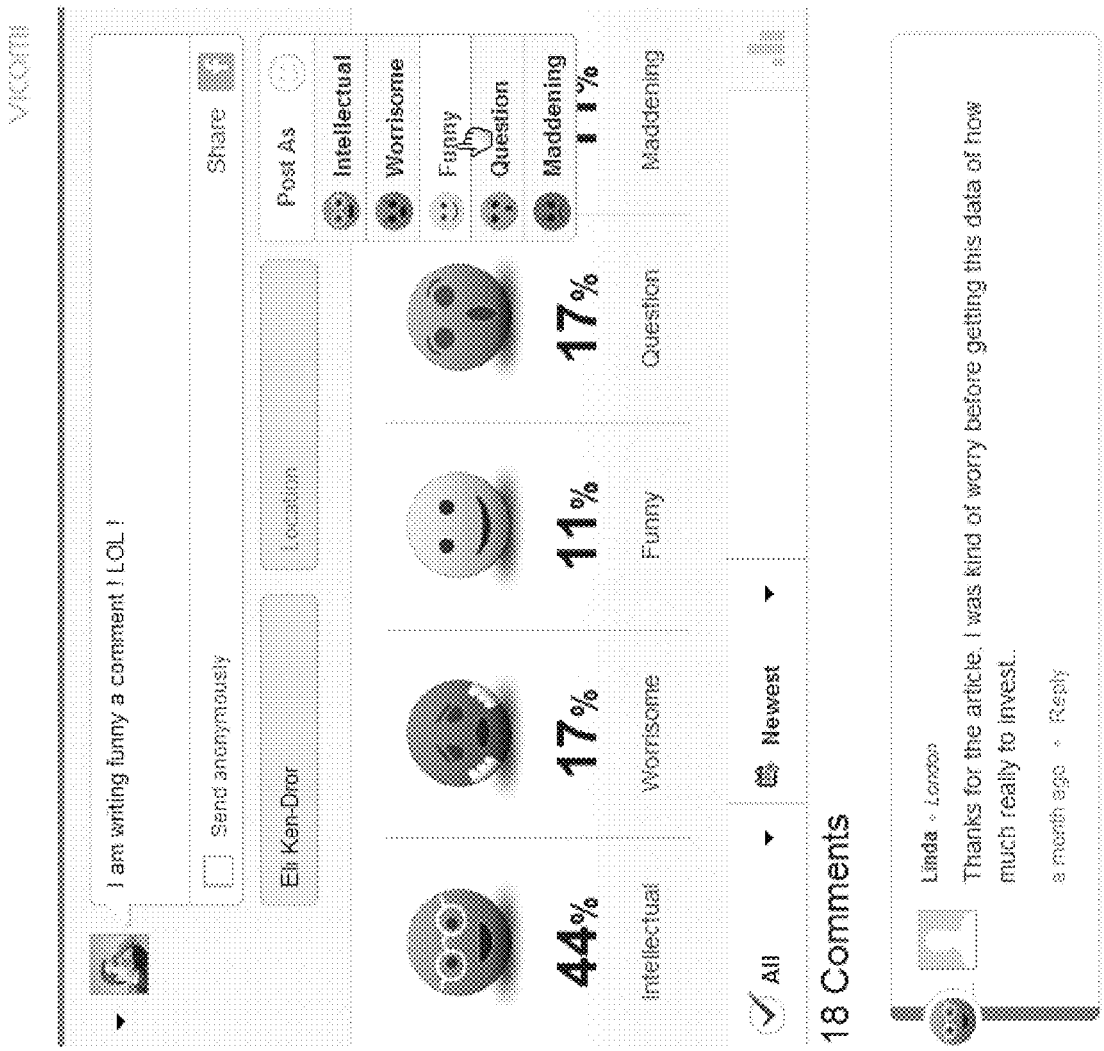
FIG. 11 an example of the GUI for entering comments according to some embodiments of the invention.

FIG. 11 an example of the GUI for entering comments according to some embodiments of the invention. The user is enabled to ad text comment by entering identifying detail and classify the type of the comment by selecting at least one icon.

Figure 12:
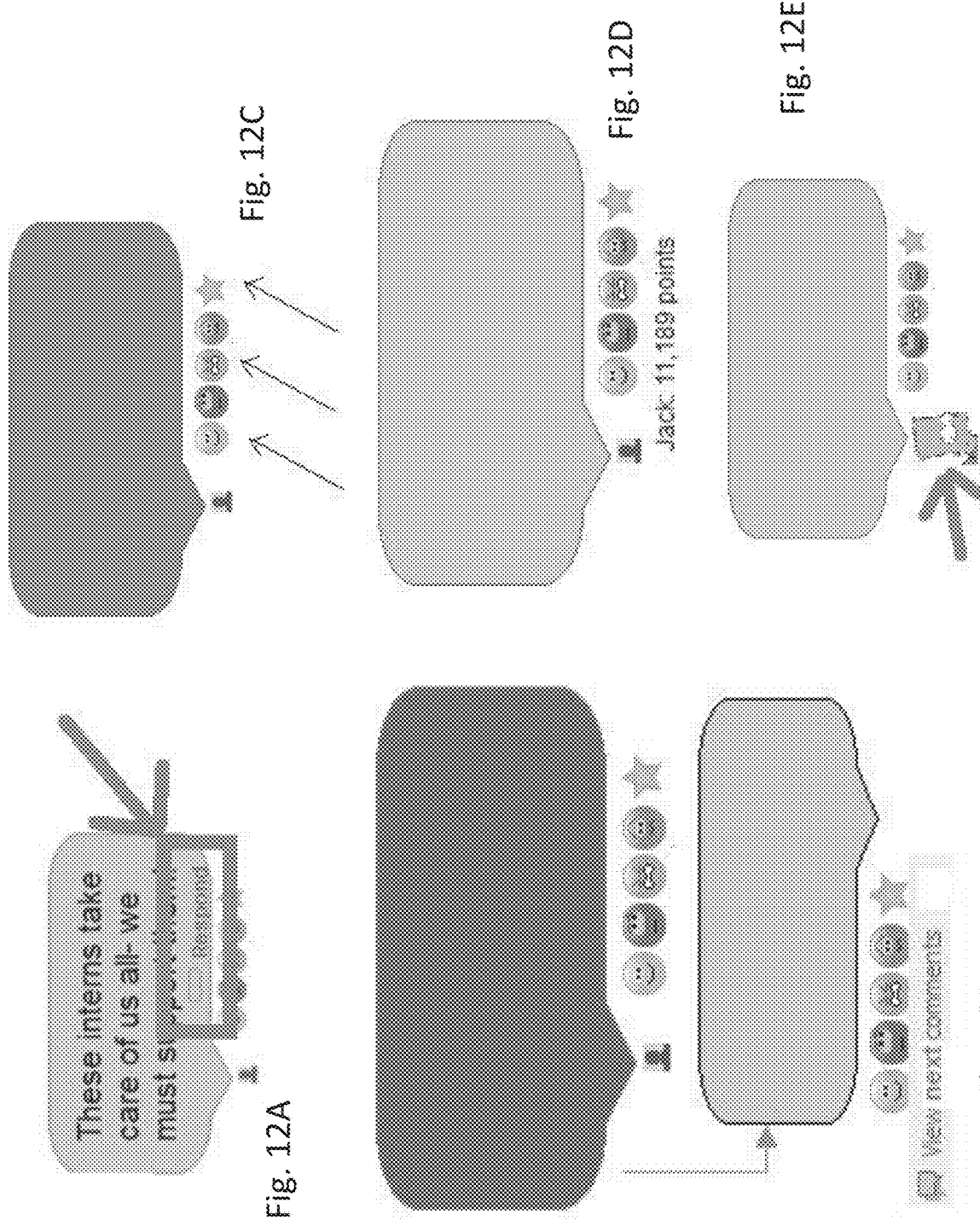
FIGS. 12A, 12B, 12C, 12D, and 12E are examples of the different ad-on features of the callouts according to some embodiments of the invention.

FIG. 12A-12E are examples of the different ad-on features of the callouts according to some embodiments of the invention. FIGS. 12A and 12B exemplify the option of inserting feedback comment to existing comment of another user, by pressing respond button (12A). Once the respond comment is inserted it appears next to the first comment with visual connection such as an arrow between the comments (12B). FIG. 12C exemplifies the option of the users to give feedback to the comments by clicking on a an icon which expresses user feeling in relation to the comment, such as smiley icon. FIG. 12D is illustrates an option according to the present invention, enabling user to win points which reflect their popularity among other users or their activities such as writing comments, responding to other users comments, giving points or voting for other comments. The aggregation of point provide the user with privileges, such advance design features or promotion with the deign layout. An example of advance design is exemplified in FIG. 12E, in which the user receives a personal icon, which can be a known famous character. Such advance design can achieved by winning points, or payment.

Figure 13:
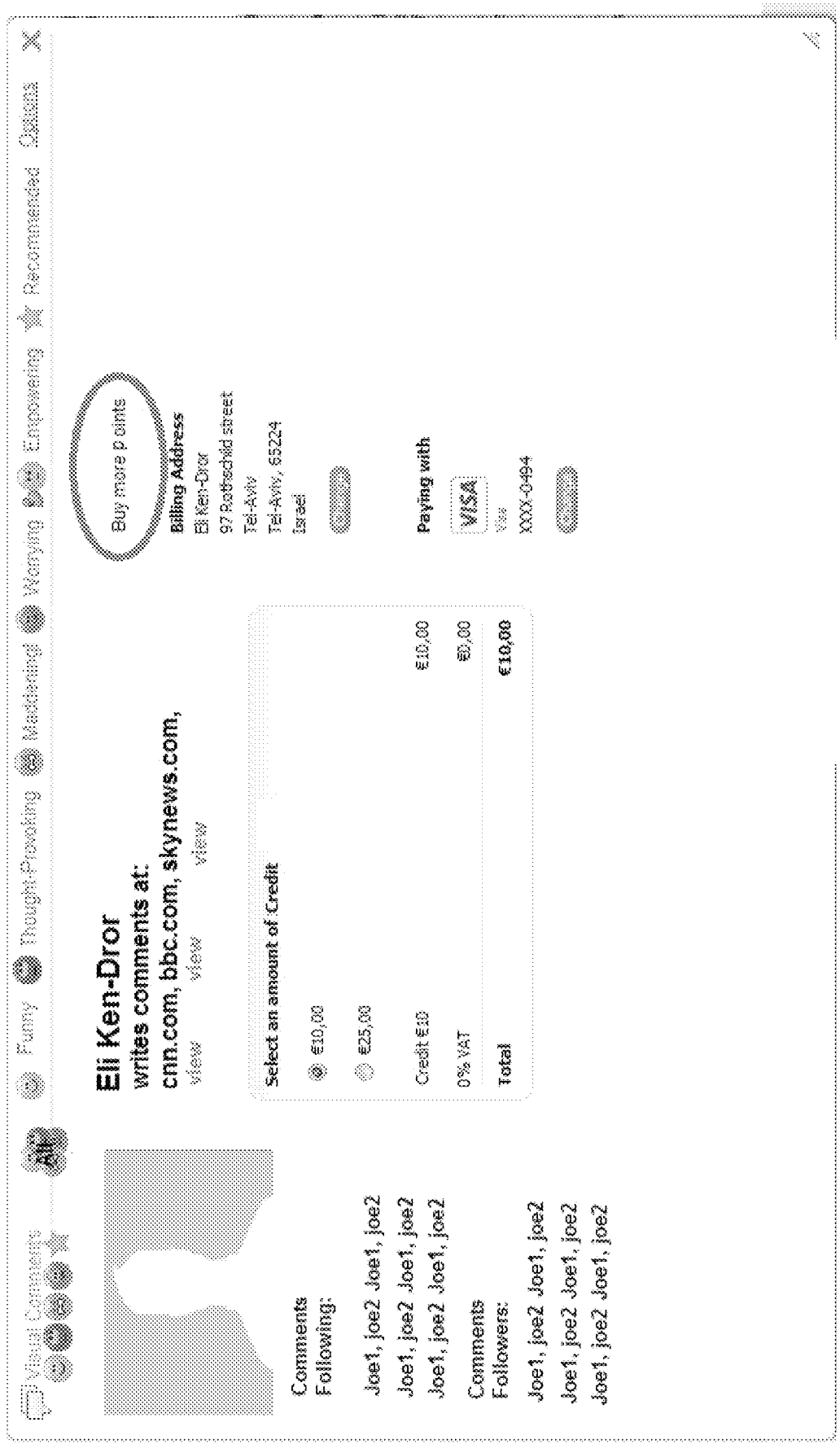
FIG. 13 is an example an option to upgrade user profile by payment according to some embodiments of the invention.

FIG. 13 is an example an option to upgrade user profile by payment according to some embodiments of the invention. According to this embodiments it is suggested to enables user to pay for upgrading their comment callout design.

Figure 14:
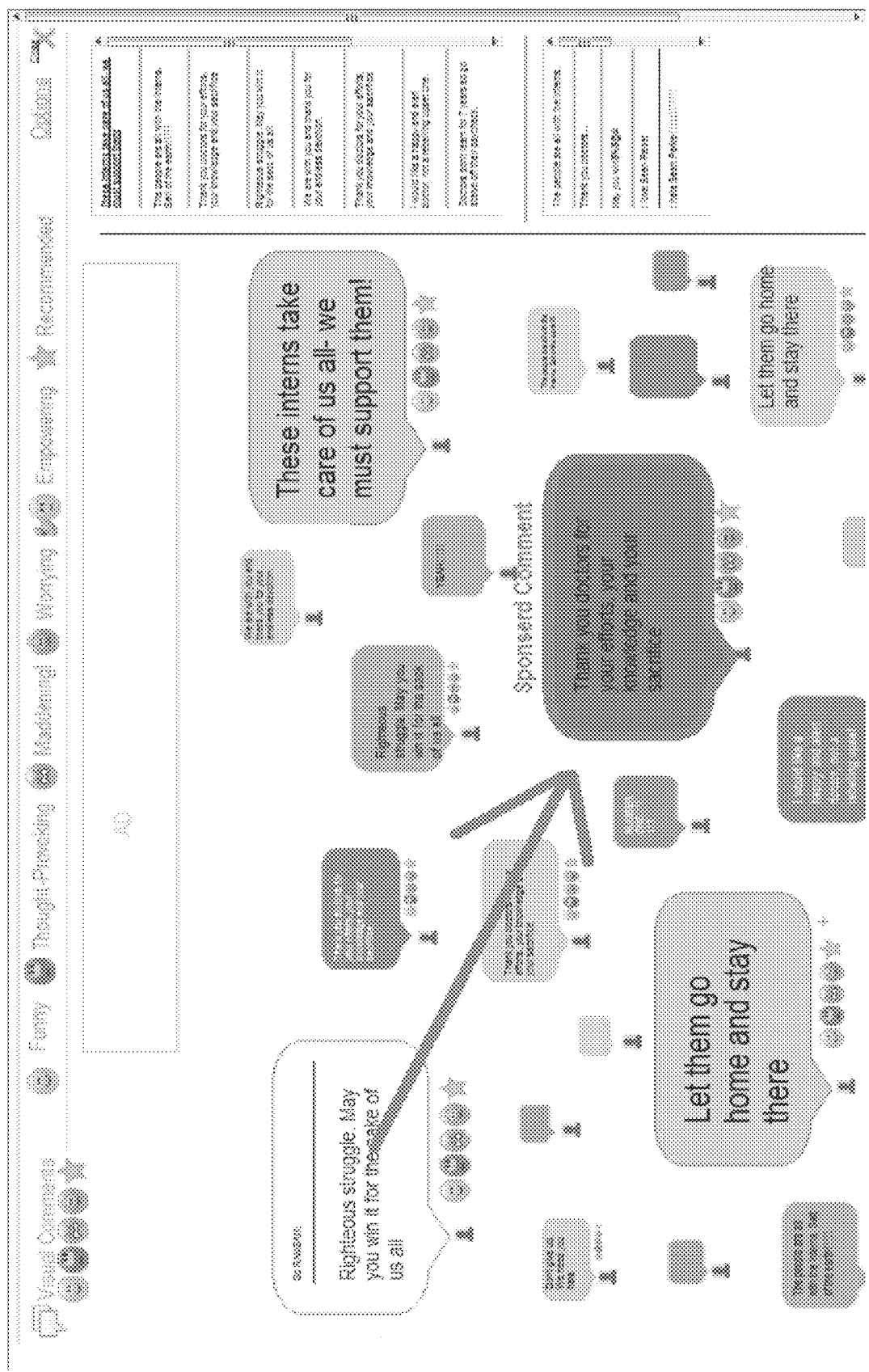
FIG. 14 is an example an zooming upgrade view of visual comments presentation according to some embodiments of the invention.

FIG. 14 is an example of zooming upgrade view of visual comments presentation according to some embodiments of the invention. This figure exemplifies an option of sponsored comment, which is highlighted and marked.

Figure 15:
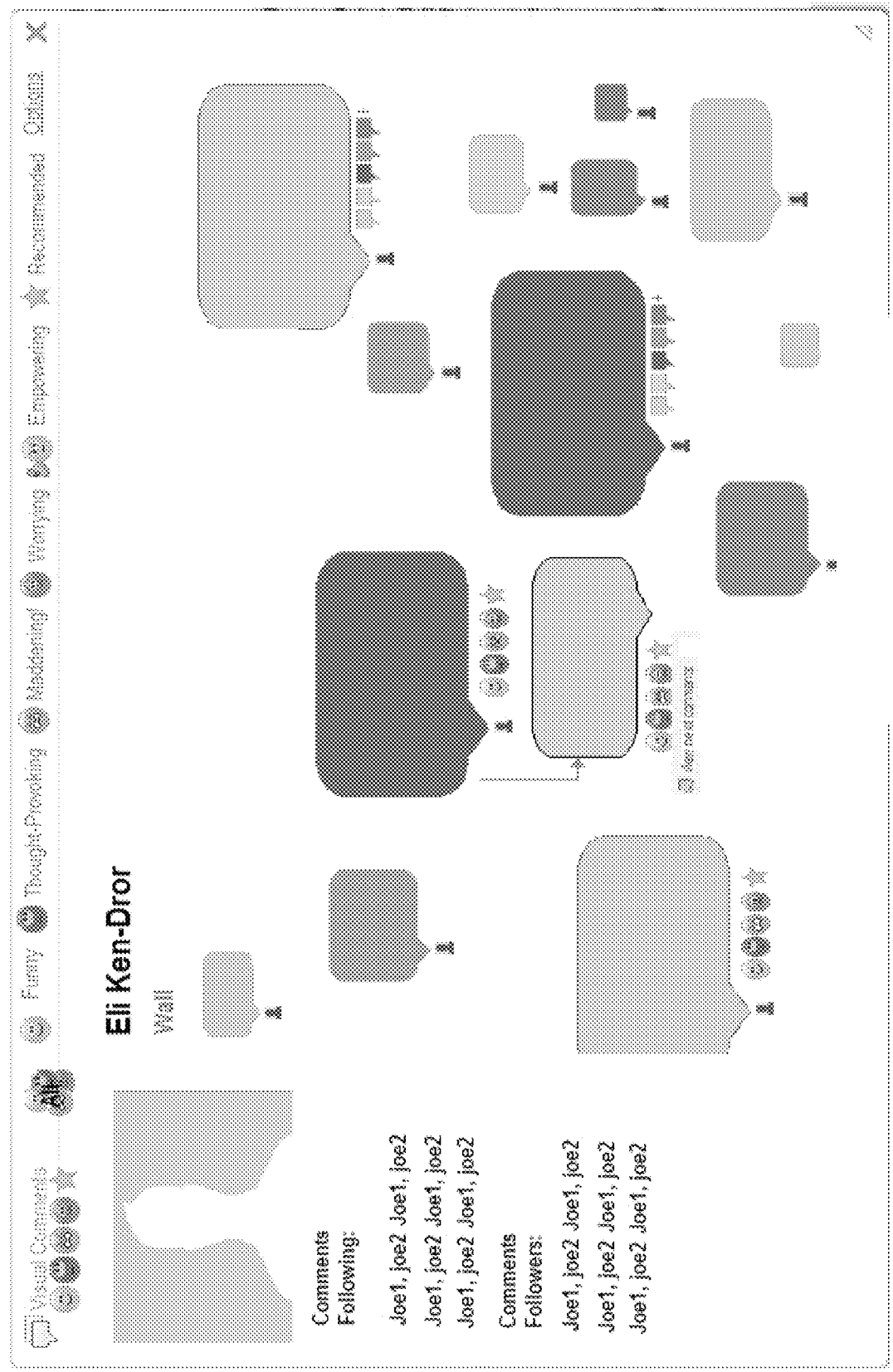
FIG. 15 is an example an aggregation of visual comments presentation of a single user from multiple websites according to some embodiments of the invention.

FIG. 15 is an example an aggregation of visual comments presentation of a single user from multiple websites according to some embodiments of the invention. The visual comments tool can be by different content providers, users which publish at different websites may have single identity and can view a personal presentation which include all their comments which relate to different content sites in a one place.

Figure 16:
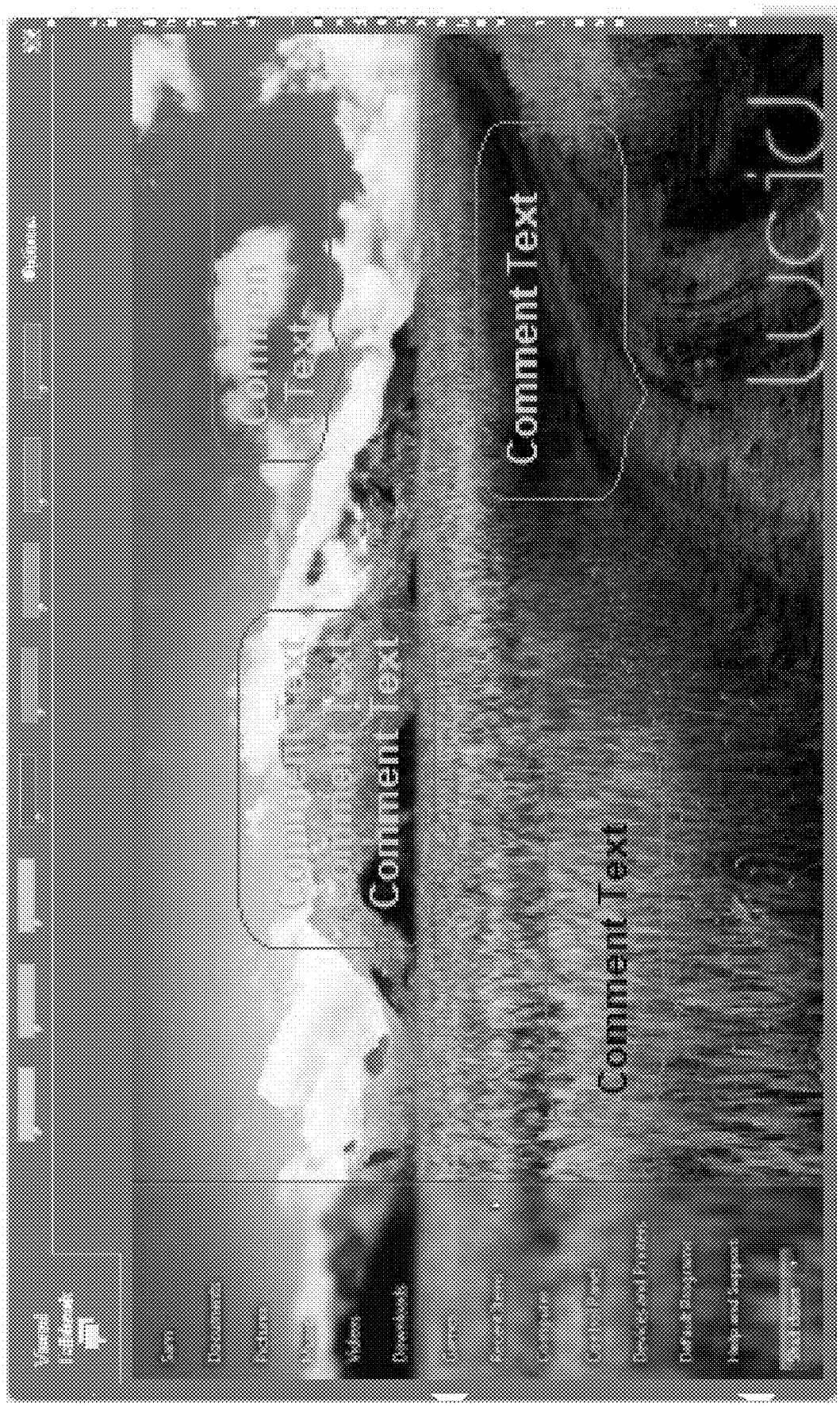
FIG. 16 is an example of visual comments presentation in transparent mode according to some embodiments of the invention.

FIG. 16 is an example of visual comments presentation in transparent mode according to some embodiments of the invention.

Figure 17:
FIG. 17 is an example of visual comments presentation in notransparent mode according to some embodiments of the invention.

FIG. 17 is an example of visual comments presentation in no-transparent mode according to some embodiments of the invention.

Figure 18:
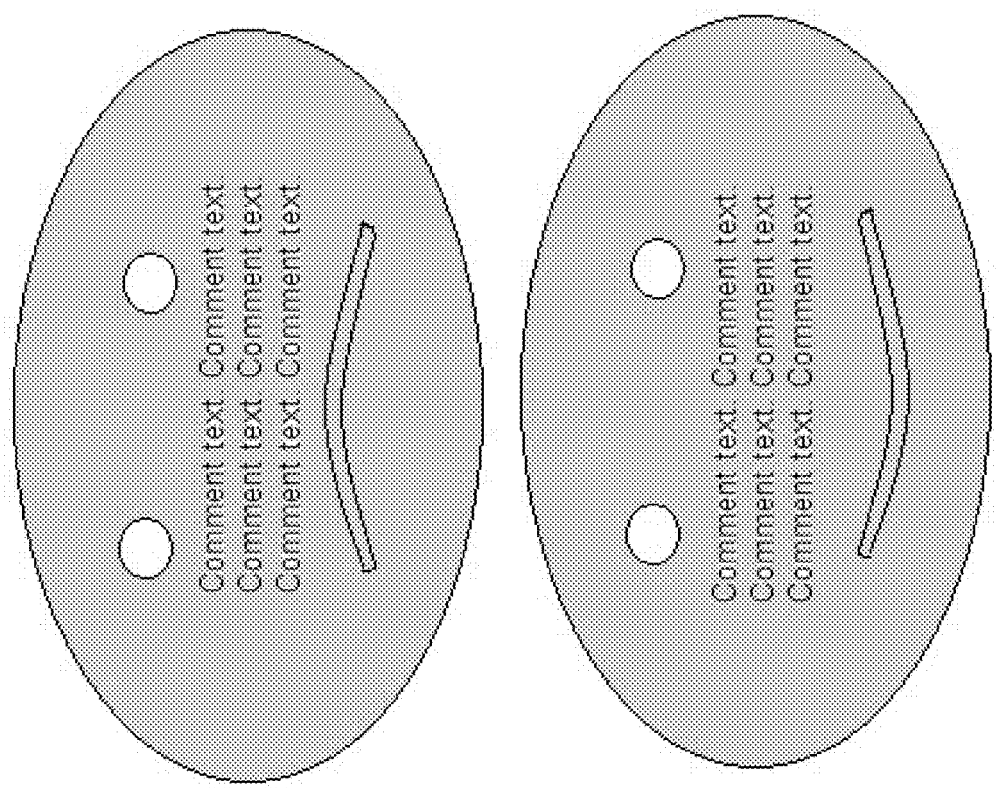
FIG. 18 is an example of visual comments callout presentation design reflecting emotion according to some embodiments of the invention.

FIG. 18 is an example of visual comments callout presentation design reflecting emotion according to some embodiments of the invention. In this example the whole callout design express the emotion, not only the color or the outline of the call out.

Figure 19:
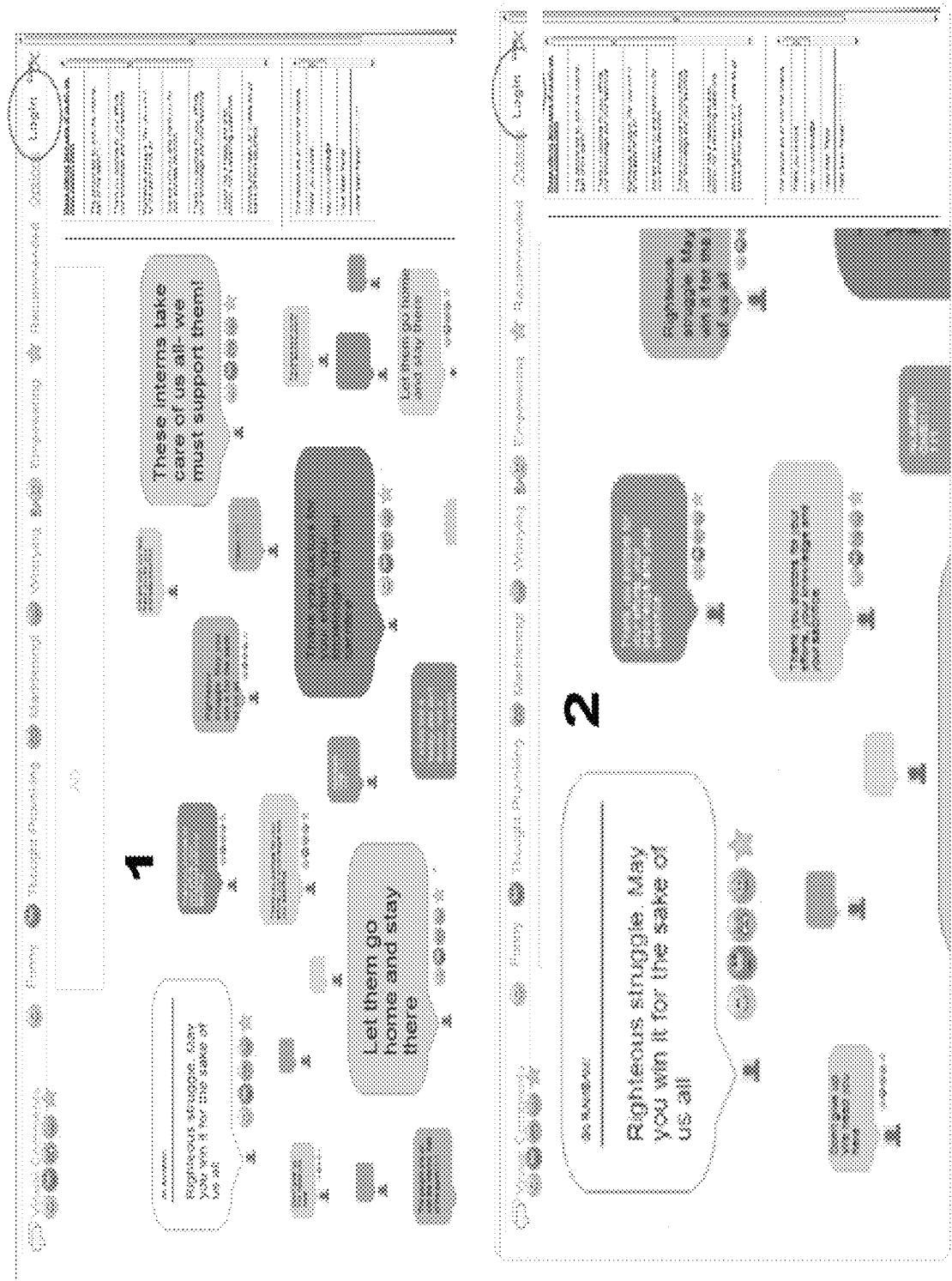
FIGS. 19-20 are examples of zooming effect for reviewing the visual comments presentation according to some embodiments of the invention.

FIG. 19 is an example of zooming effect for reviewing the visual comments presentation, according to some embodiments of the invention. By clicking on the zooming option the visual comments are enlarged, focusing only on partial area of the visual comments.

Figure 20:
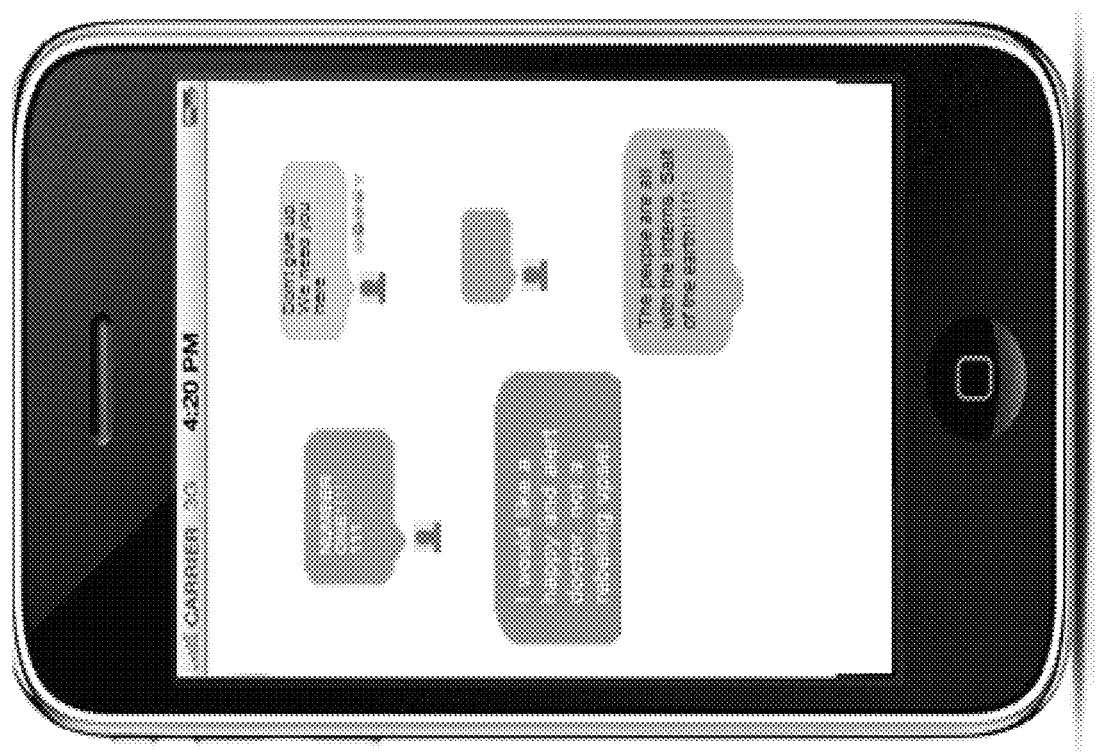

FIG. 20 is an example of reviewing the visual comments presentation on a Smartphone or tablet device, according to some embodiments of the invention.

Figure 21:
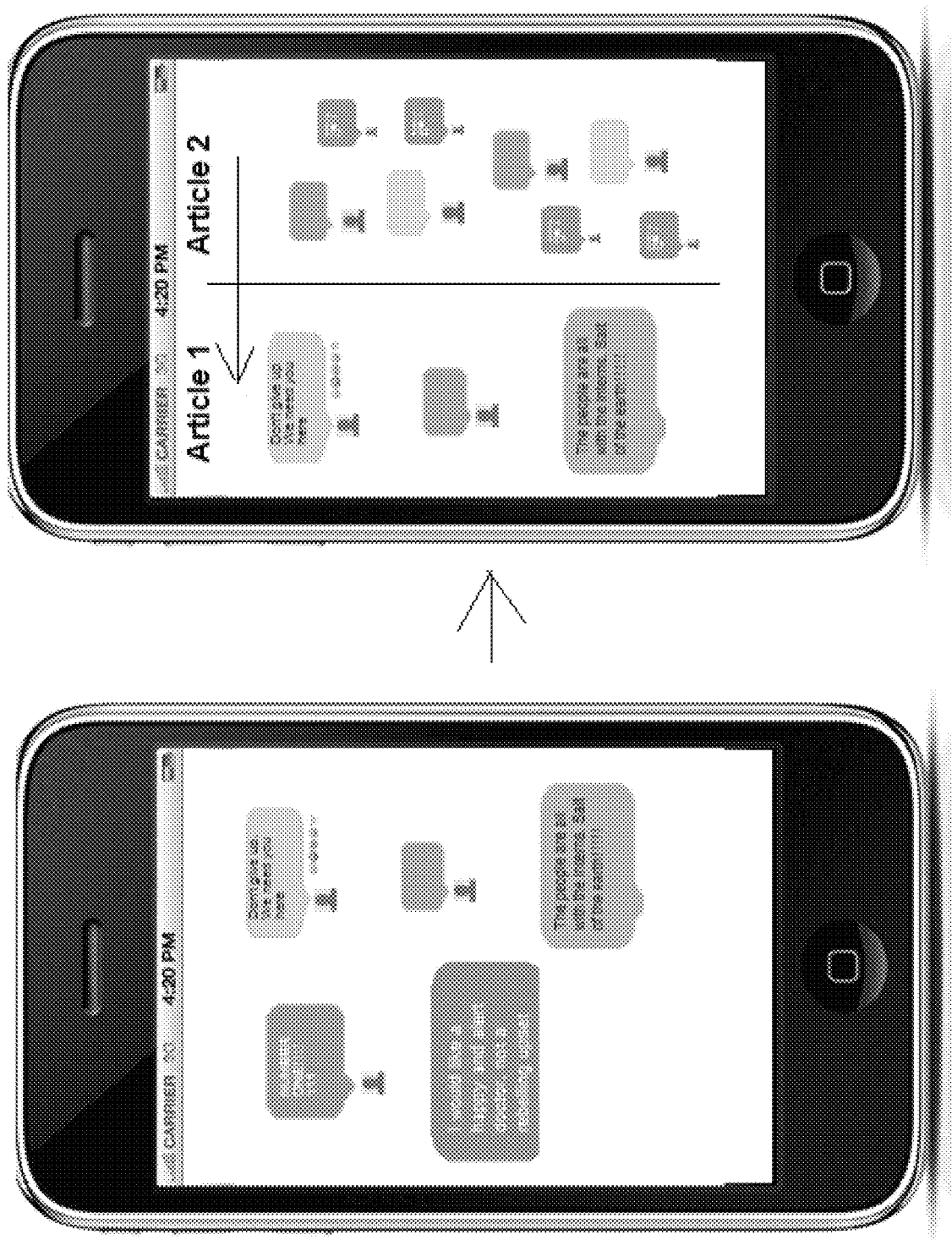
FIG. 21 is an example of reviewing the visual comments presentation on a Smartphone or tablet device having swipe option for moving between presentation screens of different articles using touch GUI commands according to some embodiments of the invention.

FIG. 21 is an example of reviewing the visual comments presentation on a Smartphone or tablet device having swipe option for moving between presentation screens of different articles using touch GUI commands according to some embodiments of the invention.

Figure 22:
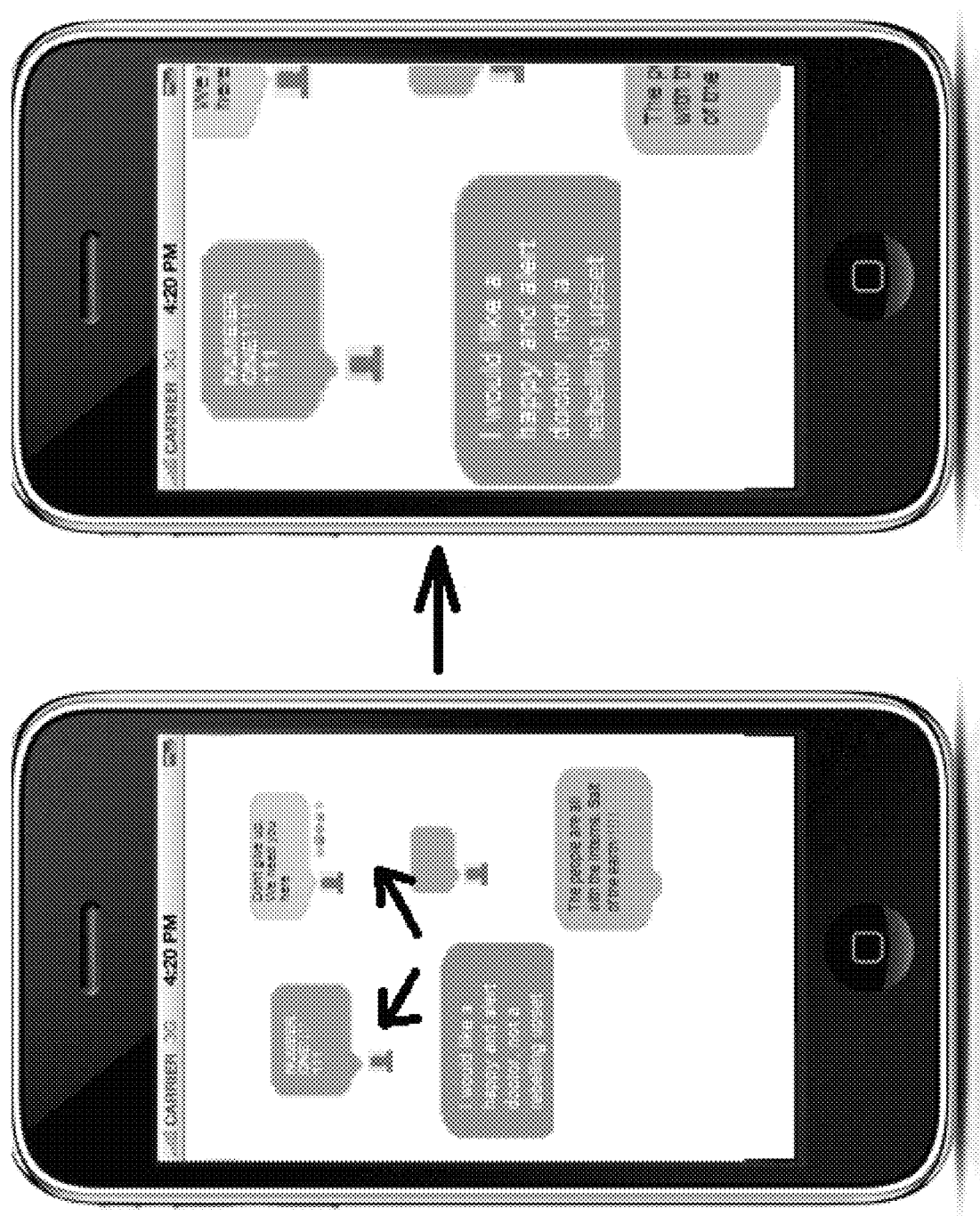
FIG. 22 is an example of reviewing the visual comments presentation on a Smartphone or tablet device having zooming option operated by touch command according to some embodiments of the invention.

FIG. 22 is an example of reviewing the visual comments presentation on a Smartphone or tablet device having zooming option operated by touch command according to some embodiments of the invention.

Figure 23:
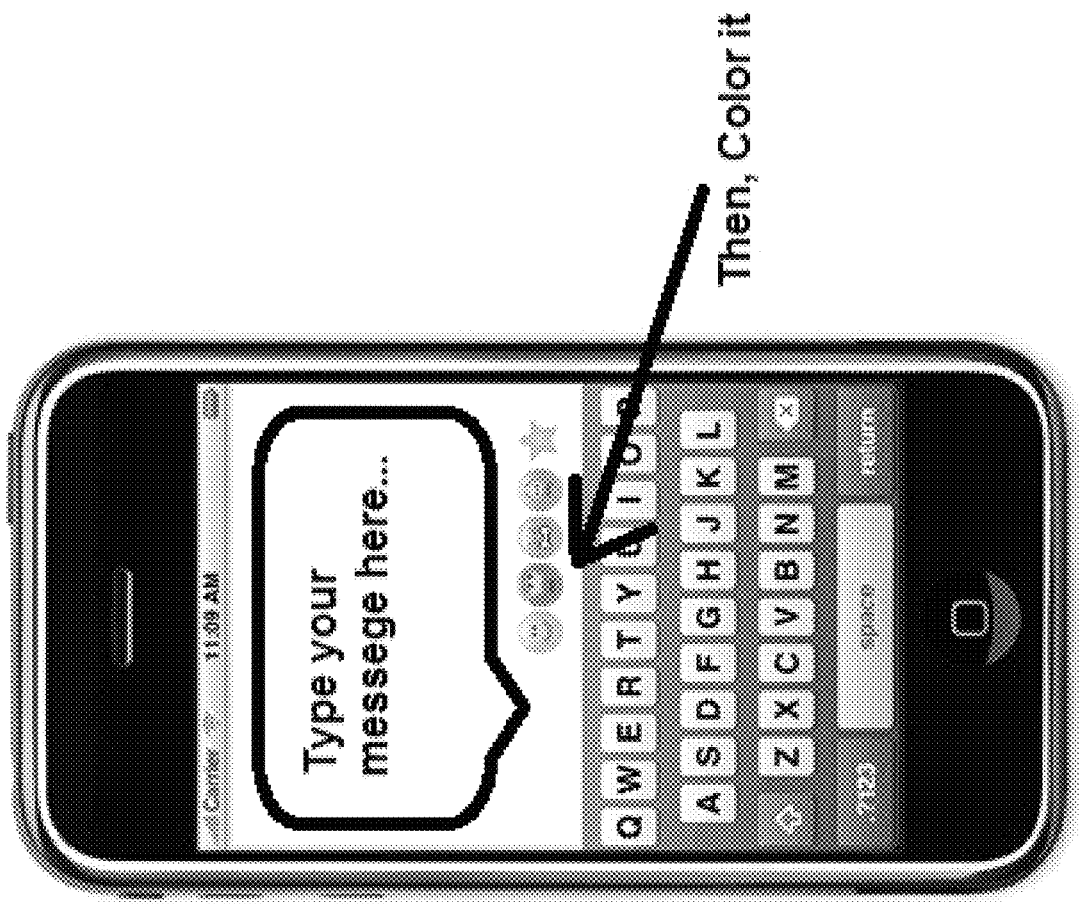
FIG. 23 is an example of GUI for inserting new comment effecting its visual look by the user according to some embodiments of the invention.

FIG. 23 is an example of GUI for inserting new comment effecting its visual design by the users according to some embodiments of the invention.

Figure 24:
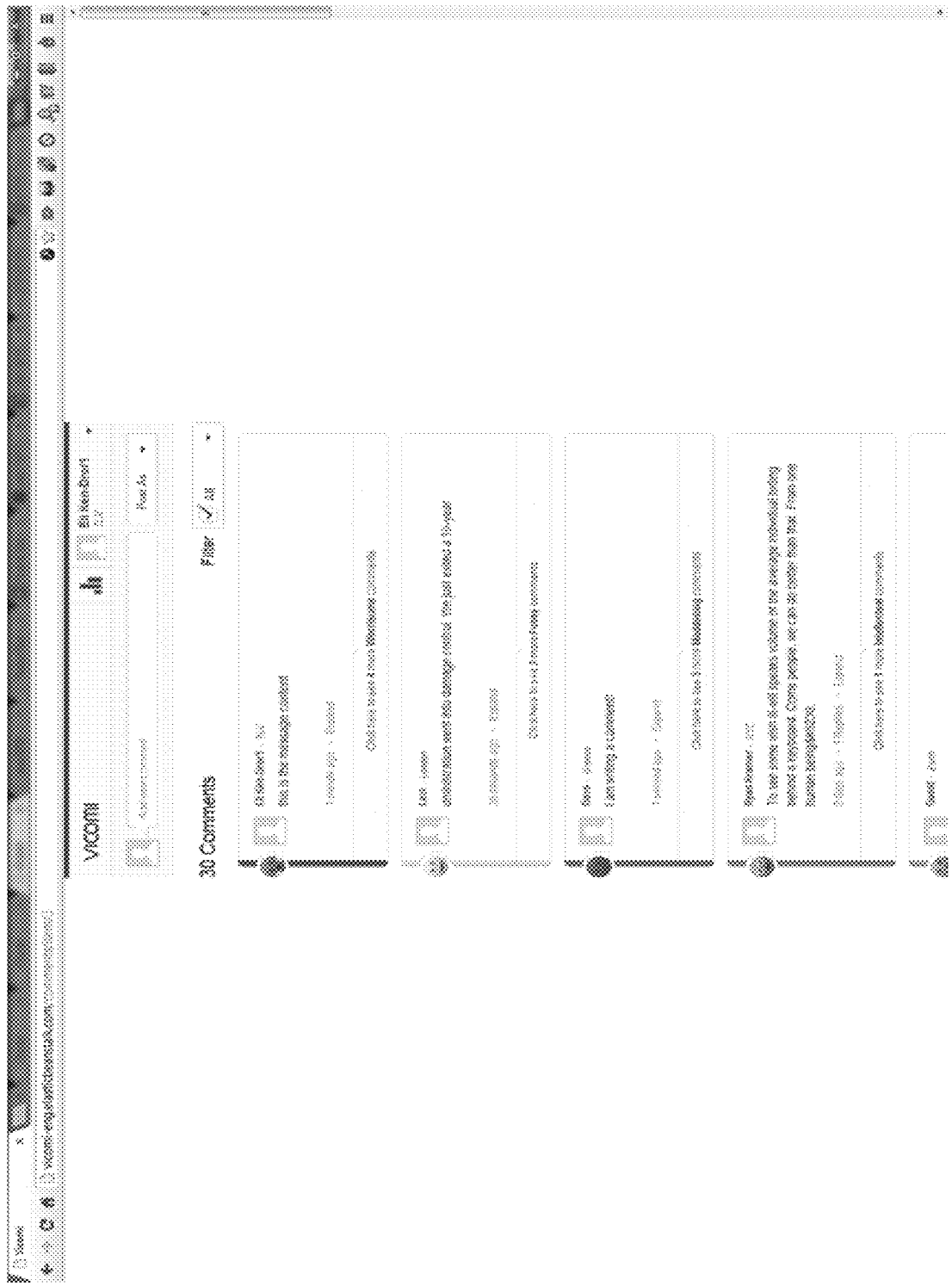
FIG. 24 is an example of displaying a comment according to some embodiments of the invention.

FIG. 24 is an example of displaying comment according to some embodiments of the invention. The comments are organized in are marked and colored according to their classification.

Figure 25:
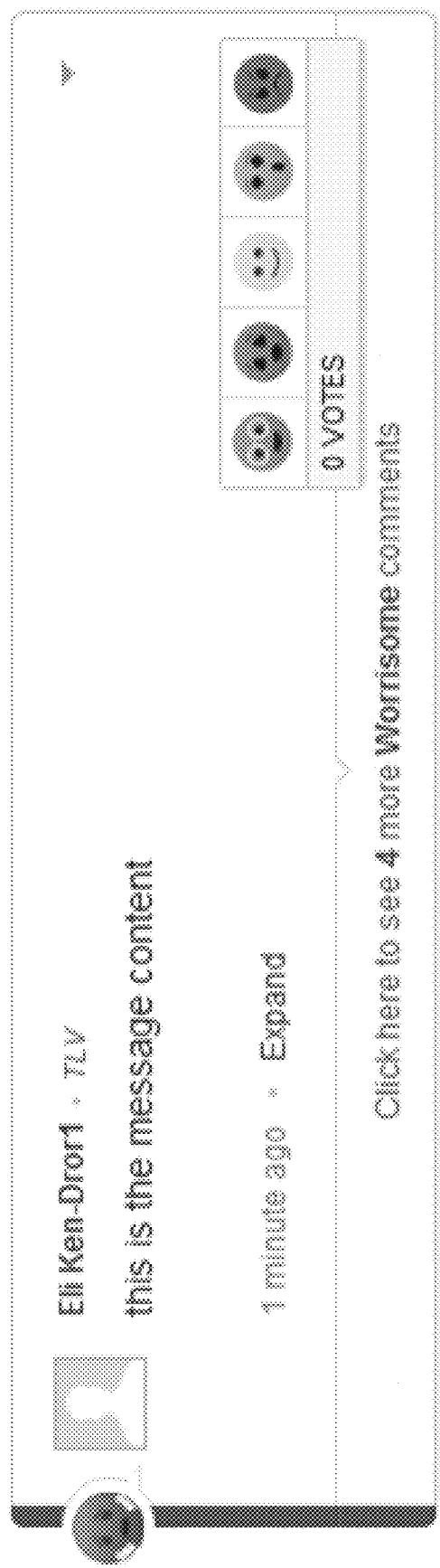
FIG. 25 is an example of reacting to a comment according to some embodiments of the invention.

FIG. 25 is an example of reacting to a comment according to some embodiments of the invention. The user is enabled to react to the comment by selecting an icon which symbolizes user emotion in relation to the comment.

Figure 26:
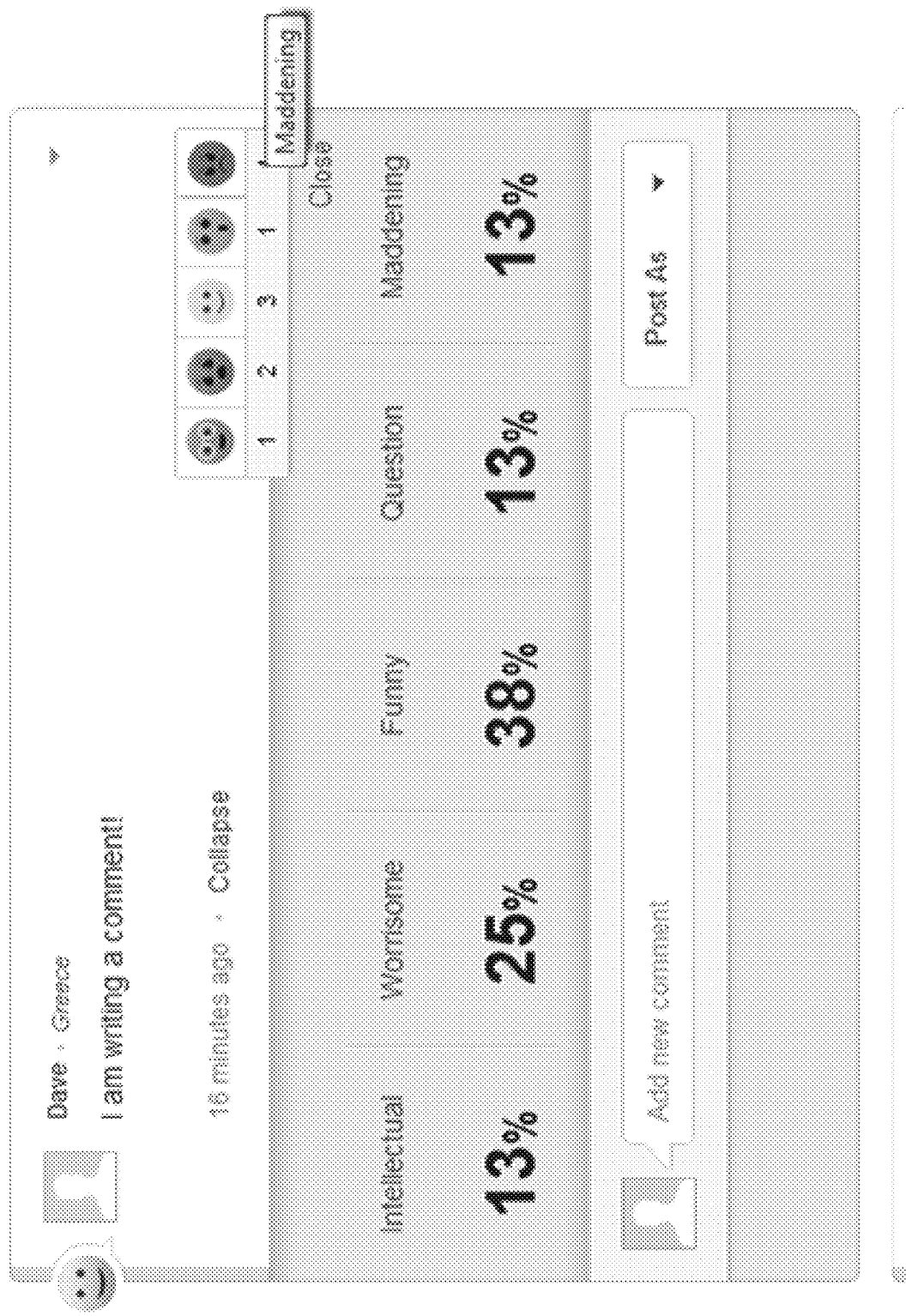
FIG. 26 is an example of reacting comments statistics according to some embodiments of the invention.

FIG. 26 is an example of react comments statistics according to some embodiments of the invention. For each comment the user can view the reactions statistics according to it's classification.

Figure 27:
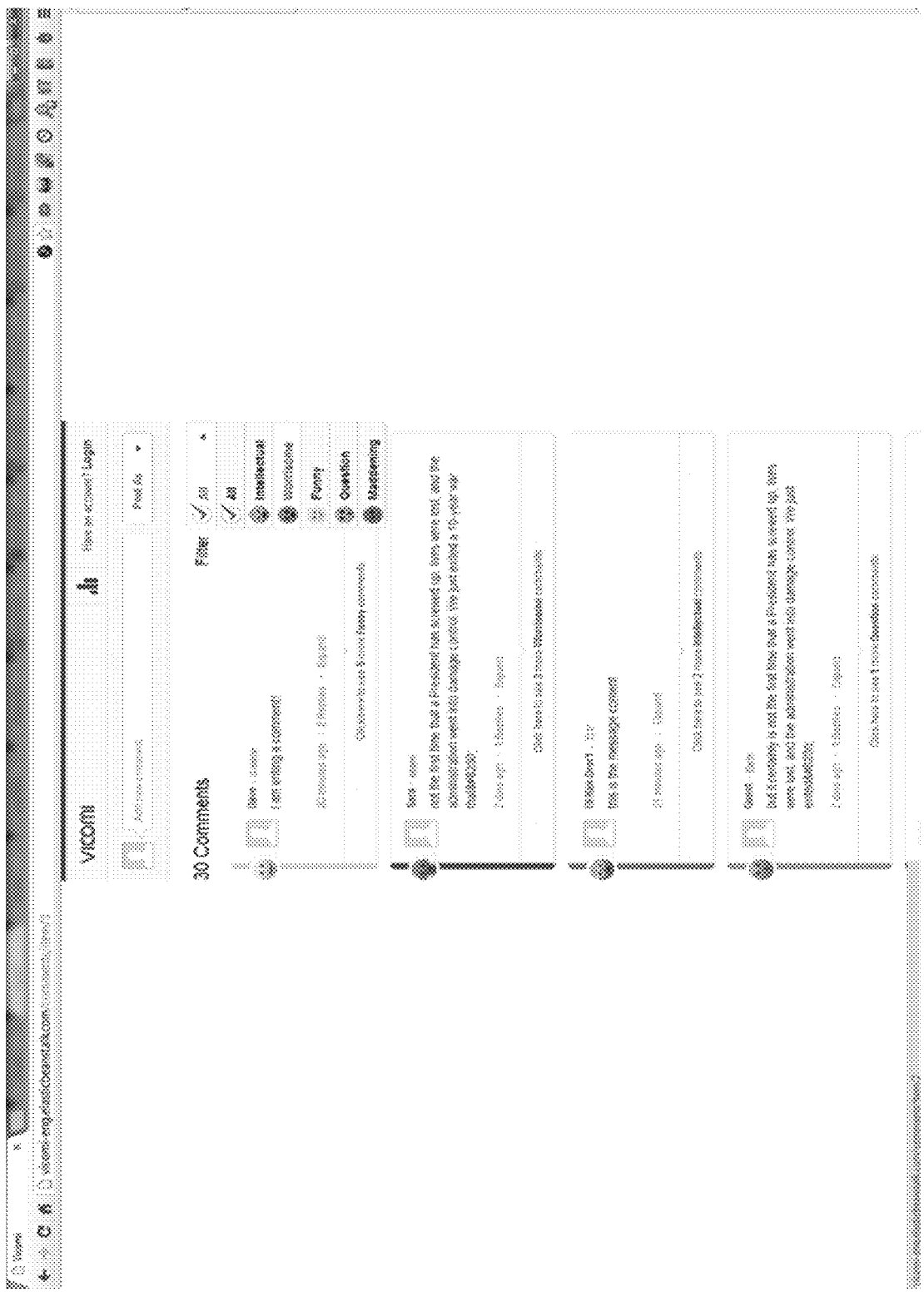
FIG. 27 is an example of filtering comments according to some embodiments of the invention.

FIG. 27 is an example of filtering comments according to some embodiments of the invention. The user may filter the comments according to their type.

Figure 28:
FIG. 28 is an example of statistical reports according to some embodiments of the invention.

FIG. 28 is an example of statistical reports according to some embodiments of the invention. These statistical reports are intended for the system moderator.

Figure 29:
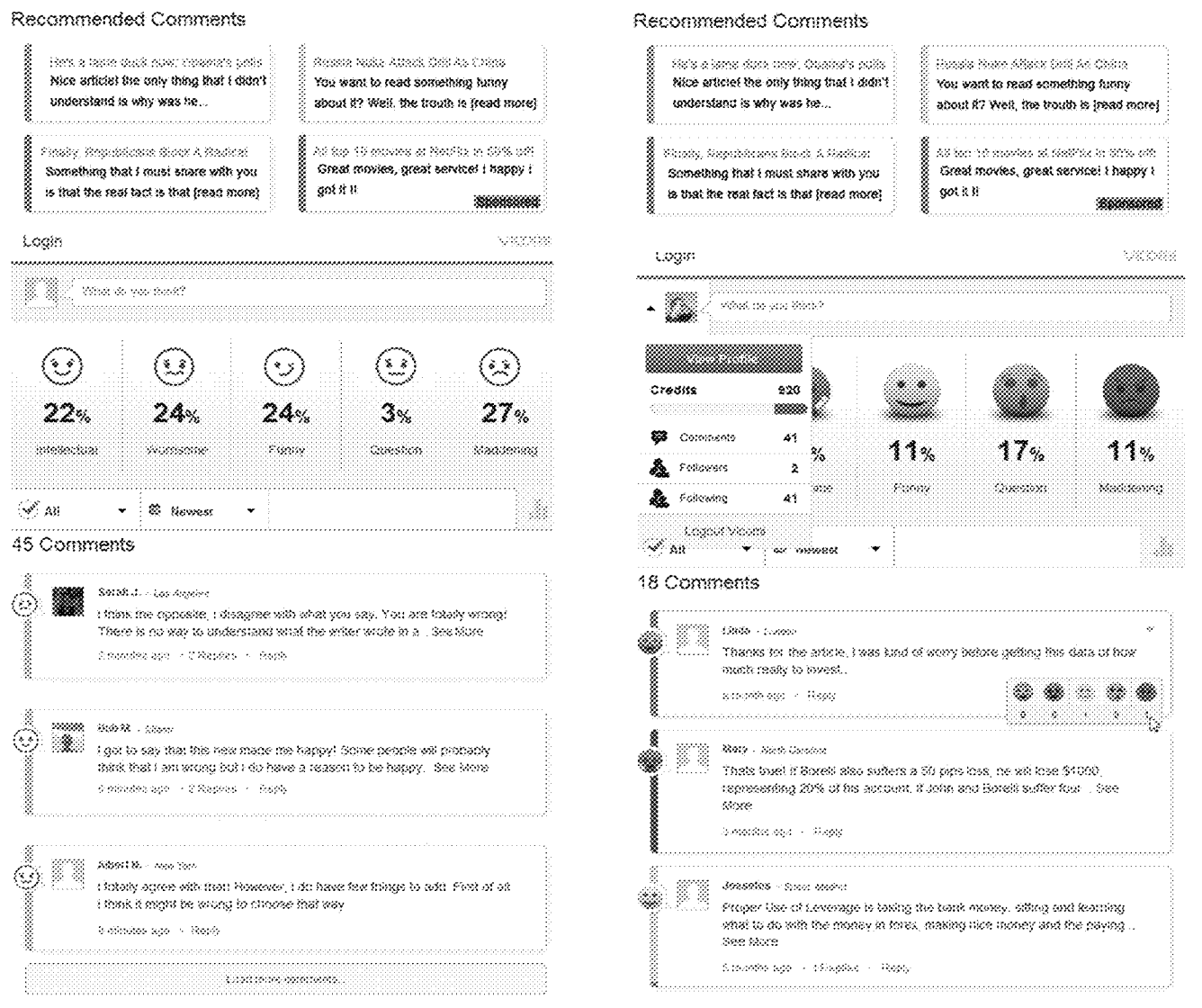

FIG. 29 is an example of providing recommendation comments according to some embodiments of the invention. The provided recommendation are based on user emotional profile as analyzed on the basis of his definitions and reaction as described in FIG. 2A.

Figure 30:
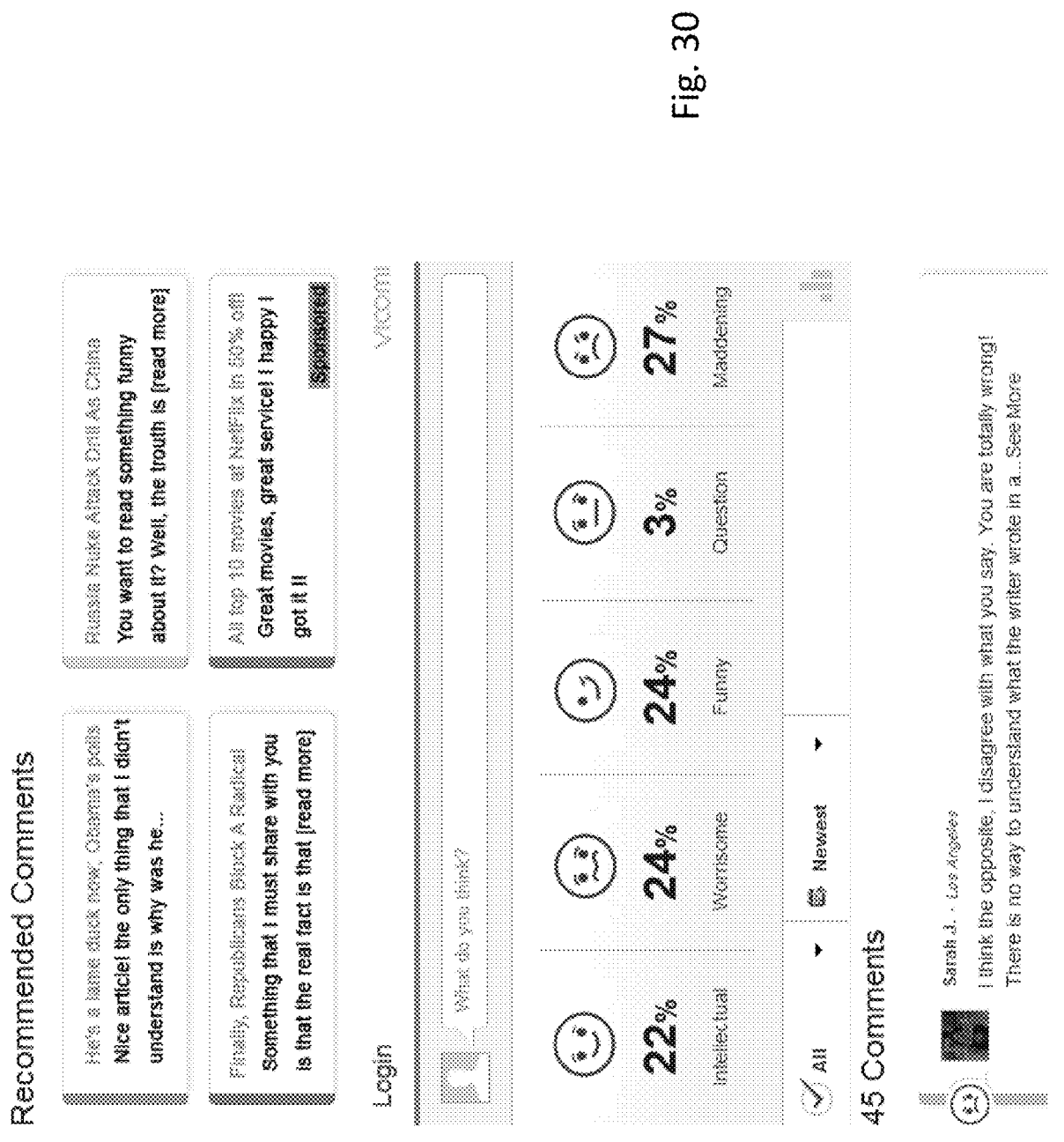

FIG. 30 is an example of providing recommendation comments according to some embodiments of the invention. In this example the comments are partly classified by their type which in not emotional such as: intellectual or question.

According to some embodiments of the present invention the visual comments system enable to filter the comments presentations according to pre-defined parameters such emotion type, user profiles (e.g. Age or location) or popularity, for example viewing only the funny comments or only the smart comments.

According to some embodiments of the present invention the visual comments service can be implemented as a toolbar for internet browsers or Smartphone application. Clicking on the toolbar button will generate a webpage that intercepts the website comments and create visual presentation of the comments as described above.

According to some embodiments of the present invention the present invention is suggested to provide a follow me service tool enabling users automatic follow up of other users comments.

According to some embodiments of the present invention is provided a modular commenting module/functionality, which can be integrated within any content website. The integration can be implemented in various techniques: using a hyperlink, which opens a commenting discussion area (as disclosed in various embodiments of the present invention) within the web page of the content web site, in the same window or in a popup window. The commenting module may only it's propriety database or include an API enabling access to the content website database.

Optionally a floating JavaScript (or any programming language that allow this feature) window will be presented on top of the website, covering between 10-100 percent of the screen. Inside this floating window, the user can view the comments in various designs as described above. The user can view all the comments that were written in relation content published in this URL such as an article, a post, blog. The comments that will be represented can be presented in different rectangle callout representation (or one of the FIG. 7 options) colors and different sizes and other options. The more the website users read the comment, the bigger the rectangle callout will be represented. The present invention system is based on user generated content, meaning that the system change its look "on the fly" according to the users decisions online. The present invention system can change its rectangle callout color according to the users decisions. If a user finds a comment funny, he can press the smiley yellow picture next to the callout button. If a user finds a comment maddening, he can press the red angry-smiley picture next to the callout button. Each of the "smiley's" represent different mood. When a majority of the readers thinks that the comment is funny for example and press the smiley face, then the rectangle callout will change it callout to yellow. Different designs to each of the comments can be implemented, examples are shown visually in the figures sections. The user may read as many comments he wants and he might be exposed to visual/voice advertisement if the website owner decide to. The user may press the upper-bar with the smiley faces and see only the funny comments or only the smart comments for example. If the user finds a comment interesting, he can see its sub-comments in a visual way as described in FIG. 15 (sub comment is a comment that has been wrote on other comment as a respond). The user may scroll down between the comment with his mouse (arrow to right-left-up-down) or to roll the mouse wheel and then to view the other comments in behind that are small becoming bigger and in front (FIG. 16).

In the display mode of the comment design can be change including: shape, color, size, font type color and size, border, border shape, background color, its location on the software window and all other visual applications as shown in the present invention figures.

The comments system according to the present invention is mainly user content driven. The users can be anonymous or registered to the system with a unique username/email and password. The user (register one or not) may read a comment and after reading it he can decide if he want to react by indicating the comment is funny, mad, interesting, smart or any other emotion that he can distinguish a comment. His emotion can be expressed by pressing a smiley, mad (or the like) faces or in any other way.

In addition, according to some embodiment of the present invention, is provided a commenting system which supports aggregating users from different website comments systems into one platform. Accordingly a user may register to this service and get a unique ID (with username and password) while with using this unique ID the users will be able to place their comments in other websites and platforms. Comments can shared or transferred from other website to another website, hence, providing a consolidation for the comments system within many websites and platforms.

According to the some embodiments of the present invention each user can accumulate points for each of his comments or actions when using the commenting system. Points can be accumulated thanks to actions that are being done by the user itself (like: writing comments, responding to other users comments, giving points or voting in the system mechanism (Funny, maddening etc) to other users comments) or by other users that writes comment on his comments or recommend or act on each of his comments. Points in this service can differentiate between regular services and premium services, while premium services may have new design and look, better representations locations (placing the comment up front) or the like. Higher points may benefit the user with higher permissions for the user.

According to the some embodiments of the present invention the user can get points on each comment that he write or he can buy points to his profile (with real money or the system internal money) that will put him up-front with his comments. A user that buy points to his profile can use these points to purchase a different look for his comments (for example: stronger yellow/color for) or different design for his callouts and profile page. In addition each user can buy avatar looks to his profile. According to the some embodiments of the present invention the user can aggregate all his comments via the comment system in all the websites that uses this commenting system. The commenting system may be implemented as a website service, as a toolbar for internet browsers or as an App for mobile device.

According to the some embodiments of the present invention the user can follow other user's comments or be followed by other users. The term follow is the same as used in Twitter.

The present invention functionalities can be processed on the tablet pc computers or smart phone as well. Working with a touch screen will enable the system to work differently than the regular computer devices. Double clicking on a touch screen device will cause the system to show the comments that are smaller. Same will be with multi touch the touch screen. Swiping the finger to the side/up/down will cause the system to show the comments on another article. When writing a comment, the user can color the comment by clicking on a color next to the comment; each color will present an emotion.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for managing and organizing comments relating to content items or multimedia objects, said method comprising the steps of:
receiving a plurality of textual comments or textual reactions or multimedia originated by one or more first users or second users where the first users react to a plurality of content items or common multimedia objects, where the second users react to comments or multimedia objects of the first users;
enabling a plurality of said first or second users to react to ones of the content items or multimedia objects by selecting one type of reaction from multiple choice of reaction types;
aggregating all user feedback by a visual comments server for analyzing user comments and feedback, wherein the analyzing includes calculating viewing and feedback statistics of comments and analyzing feedback comments to other user comments;
based on said analysis organizing the comments or multimedia objects within a network page according to pre-defined parameters of emotion type;
wherein the analysis further comprises checking user activities or selections or reactions in relation to the content or multimedia object, comprising at least one of: viewings ads, purchasing activities, reading content;
wherein the analyzing is further based on a user profile which is updated on the basis of user activities or selections or reaction of textual or multimedia comment characteristics;
wherein the organization and relative location of each textual or multimedia comment/object is customized according to a user or users group profile, wherein the profile is updated on the basis of user selection of textual or multimedia comment characteristics, wherein the user profile is dynamically updated based on user reaction selections;
wherein updating user profile data serves as a basis for the emotion analysis.

2. A system comprising a plurality of modules of program instructions embodied on a computer-readable medium, wherein execution of the modules of program instructions by a processor of a computer system causes the processor to manage and organize comments relating to content items or multimedia objects, said modules of said system comprised of:
a graphical user interface (GUI) module configured and operable to:
receive a plurality of textual comments or textual reactions or multimedia originated by one or more first users or second users, where the first users react to a plurality of content items or multimedia objects, where the second users react to comments or multimedia objects of the first users; and
enable a plurality of said first or second users to react to ones of the content items or multimedia objects by selecting one type of reaction from a plurality of reaction types; and
a processing module implemented on a server and configured and operable to aggregate all user feedback by a visual comments server for analyzing user comments and feedback, wherein the analyzing includes calculating viewing and feedback statistics of comments and analyzing feedback comments to other users comments, and based on said analysis to organize the comments or multimedia objects within a network page according to pre-defined parameters of emotion type;
wherein the analysis further comprises checking user activities or selections or reactions in relation to the content or multimedia object, comprising at least one of: viewings ads, purchasing activities, reading content;
wherein the analyzing is further based on a user profile which is updated on the basis of user activities or selections or reaction of textual or multimedia comment characteristics;
wherein the organization and relative location of each textual or multimedia comment/object is customized according to a user or users group profile, wherein the profile is updated on the basis of user selection of textual or multimedia comment characteristics, wherein the user profile is dynamically updated based on user reaction selections;
wherein updating user profile data serves as a basis for the emotion analysis.

3. The method of claim 1 wherein the organizing is correlated user emotional attitude.

4. The method of claim 1 further comprising dynamically analyzing characteristics of each of the plurality of textual or multimedia comments based on selected reaction types of the plurality of second users.

5. The method of claim 1, wherein organizing include design layout of textual or multimedia comment or content objects.

6. The method of claim 1, wherein the characteristics analysis comprises natural language programming (NLP) or sentiment analysis of content of the textual or multimedia comments.

7. The system of claim 2 wherein the filtering and organizing are correlated user emotional attitude.

8. The system of claim 2 wherein the analyzing further comprises dynamically analyzing characteristics of each of the plurality of textual or multimedia comments/objects based on selected reaction types of the plurality of second users.

9. The system of claim 2, further comprising the step of organizing a layout of the plurality of textual comments or multimedia objects.

10. The system of claim 2, wherein the analysis comprises neuro-linguistic programming or sentiment analysis of textual or multimedia comment content.

11. The system of claim 2, wherein the analysis further comprises checking user activities in relation to the content item or multimedia object, comprising at least one of:

viewings ads, purchasing activities, content written, content read, Video watching, user reactions.

\* \* \* \* \*